(12) United States Patent
Tomigashi et al.

(10) Patent No.: US 7,245,104 B2
(45) Date of Patent: Jul. 17, 2007

(54) POSITION-SENSORLESS MOTOR CONTROL DEVICE

(75) Inventors: Yoshio Tomigashi, Hirakata (JP); Hiroshi Takao, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/503,247

(22) Filed: Aug. 14, 2006

(65) Prior Publication Data

US 2007/0040528 A1 Feb. 22, 2007

(30) Foreign Application Priority Data

Aug. 16, 2005 (JP) .............................. 2005-235720

(51) Int. Cl.
*H02P 6/08* (2006.01)
*H02P 27/00* (2006.01)

(52) U.S. Cl. ................... 318/705; 318/721; 318/700; 318/799; 318/805

(58) Field of Classification Search ............... None
See application file for complete search history.

(56) References Cited

U.S. PATENT DOCUMENTS

| | | | | |
|---|---|---|---|---|
| 6,388,420 B1 * | 5/2002 | Jansen et al. | ................ | 318/799 |
| 6,462,492 B1 * | 10/2002 | Sakamoto et al. | .......... | 318/254 |
| 6,552,509 B2 * | 4/2003 | Veltman | ................ | 318/807 |
| 6,639,380 B2 * | 10/2003 | Sul et al. | ................ | 318/727 |
| 6,763,622 B2 * | 7/2004 | Schulz et al. | ................ | 318/700 |
| 6,825,646 B2 * | 11/2004 | Colombo | ................ | 324/76.77 |
| 7,045,988 B2 * | 5/2006 | Ha et al. | ................ | 318/807 |
| 7,088,077 B2 * | 8/2006 | Nagashima et al. | .......... | 322/37 |
| 7,180,262 B2 * | 2/2007 | Consoli et al. | ............. | 318/705 |
| 2003/0122521 A1 * | 7/2003 | Colombo | ................ | 318/700 |
| 2004/0070360 A1 * | 4/2004 | Schulz et al. | ............... | 318/700 |
| 2004/0070362 A1 * | 4/2004 | Patel et al. | ................. | 318/701 |
| 2004/0113582 A1 * | 6/2004 | Ide | ................ | 318/717 |
| 2006/0082335 A1 * | 4/2006 | Imai et al. | ................... | 318/254 |
| 2006/0091847 A1 * | 5/2006 | Piippo | ........................ | 318/721 |
| 2006/0119305 A1 * | 6/2006 | Lee et al. | ................... | 318/609 |
| 2006/0125439 A1 * | 6/2006 | Ajima et al. | ................ | 318/716 |

FOREIGN PATENT DOCUMENTS

| | | |
|---|---|---|
| JP | 2002-051597 | 2/2002 |
| JP | 2003-153582 | 5/2003 |
| JP | 2003-219682 | 7/2003 |
| JP | 2004-080986 | 3/2004 |

* cited by examiner

*Primary Examiner*—Lincoln Donovan
*Assistant Examiner*—Eduardo Colon Santana
(74) *Attorney, Agent, or Firm*—NDQ&M Watchstone LLP; S. Peter Konzel

(57) ABSTRACT

A position-sensorless motor control device has a superposer that superposes, on the drive current with which the motor is driven, a superposed current having a different frequency than the drive current, a superposed component extractor that extracts, from the motor current fed to the motor, the γ-axis and δ-axis components of the superposed current, and a controller that controls the motor so that the direct-current component of the arithmetic product of the extracted γ-axis and δ-axis components of the superposed current converges to zero.

15 Claims, 11 Drawing Sheets

$\Delta \theta = 0°$ $\Delta \theta \neq 0°$

POSITION-SENSORLESS MOTOR CONTROL DEVICE

This application is based on Japanese Patent Application No. 2005-235720 filed on Aug. 16, 2005, the contents of which are hereby incorporated by reference.

BACKGROUND OF THE INVENTION

1. Field of the Invention

The present invention relates to a position-sensorless motor control device that drives and controls a motor without the use of a rotor position sensor. The present invention also relates to a motor drive system incorporating such a position-sensorless motor control device.

2. Description of Related Art

There have conventionally been developed techniques for detecting the rotor position of a motor without the use of a sensor. Some of such techniques propose to exploit injection of a high-frequency rotation voltage or a high-frequency rotation current.

For example, JP-A-2003-219682 discloses a technique according to which a high-frequency rotation voltage is applied to a motor, and the rotor position thereof is estimated based on the major-axis direction of the ellipse described by the current vector locus. JP-A-2004-80986 discloses a technique according to which a high-frequency rotation voltage is applied to a motor, and the current that flows therethrough is converted into a current on the $\alpha$-$\beta$ axes; then the peak values and the phases of the $\alpha$-axis and $\beta$-axis components of this current are detected to find the angle of the ellipse major axis (d axis) from the $\alpha$ axis.

JP-A-2002-51597 discloses a technique according to which the cosine and the sine of the mid-angle between the in-phase magnetic flux vector and the mirror-phase magnetic flux vector of a high-frequency wave are estimated, and these estimated values are used as rotation signals for a vector rotator. JP-A-2003-153582 discloses a technique according to which a mapping between the positive-phase axis and the negative-phase axis is exploited to estimate the rotor position.

Disadvantageously, however, according to any of the techniques disclosed in the documents mentioned above, to obtain a signal based on which the rotor position can be estimated, it is necessary to subject the extracted signals to complicated processing; that is, they enable position-sensorless control indeed, but only through complicated processing.

SUMMARY OF THE INVENTION

In view of the conventionally experienced inconveniences mentioned above, it is an object of the present invention to provide a position-sensorless motor control device, and a motor drive system incorporating it, that enables position-sensorless control through very simple processing (i.e. with a very small amount of computational operation).

To achieve the above object, with a first configuration according to the present invention, let the axis parallel to the magnetic flux produced by the permanent magnet forming the rotor of the motor be called the d axis, let the axis estimated, for the purpose of control, to correspond to the d axis be called the $\gamma$ axis, and let the axis estimated to lead the $\gamma$ axis by an electrical angle of 90 degrees be called the $\delta$ axis, then a position-sensorless motor control device that controls the motor such that the axis error between the d- and $\gamma$-axes is reduced is provided with: a superposer that superposes, on the drive current with which the motor is driven, a superposed current having a different frequency than the drive current; a superposed component extractor that extracts, from the motor current fed to the motor, the $\gamma$-axis and $\delta$-axis components of the superposed current; and a controller that reduces the axis error by controlling the motor based on the arithmetic product of the $\gamma$-axis and $\delta$-axis components of the superposed current.

With the configuration described above, it is possible to reduce the axis error through very simple processing (i.e. with a very small amount of computational operation).

More specifically, in the first configuration described above, for example, the superposer may superpose the superposed current on the drive current by superposing a superposed voltage commensurate with the superposed current on the drive voltage that is applied to the motor to pass the drive current therethrough.

In the first configuration described above, for example, the controller may reduce the axis error by controlling the motor based on the direct-current component of the arithmetic product.

In the first configuration described above, for example, the controller may reduce the axis error by controlling the motor such that the direct-current component converges to zero.

In the first configuration described above, for example, the voltage vector locus of the superposed voltage on the $\gamma$-$\delta$ axes may describe a figure symmetric about the $\gamma$ or $\delta$ axis.

In the first configuration described above, for example, the voltage vector locus of the superposed voltage on the $\gamma$-$\delta$ axes may describe a perfect circle, or an ellipse having the minor or major axis thereof on the $\gamma$ axis, or a line segment on the $\gamma$ or $\delta$ axis.

In the first configuration described above, for example, the motor may be a non-salient-pole motor, and the superposed voltage that the superposer superposes on the drive voltage may be a voltage that causes the d-axis component of the inductance of the motor to vary by magnetic saturation attributable to the $\gamma$-axis component of the superposed current.

As mentioned above, the position-sensorless motor control device having the first configuration described above can be used even with a non-salient-pole motor.

To achieve the above object, with a second configuration according to the present invention, let the axis parallel to the magnetic flux produced by the permanent magnet forming the rotor of the motor be called the d axis, let the axis estimated, for the purpose of control, to correspond to the d axis be called the $\gamma$ axis, and let the axis estimated to lead the $\gamma$ axis by an electrical angle of 90 degrees be called the $\delta$ axis, then a position-sensorless motor control device that controls the motor such that the axis error between the d- and $\gamma$-axes is reduced is provided with: a superposer that superposes, on the drive current with which the motor is driven, a superposed current having a different frequency than the drive current; a superposed component extractor that extracts the $\gamma$-axis and $\delta$-axis components of the superposed voltage that is applied to the motor to superpose the superposed current on the drive current; and a controller that reduces the axis error by controlling the motor based on the arithmetic product of the extracted $\gamma$-axis and $\delta$-axis components of the superposed voltage.

With the configuration described above, it is possible to reduce the axis error through very simple processing (i.e. with a very small amount of computational operation).

More specifically, in the second configuration described above, for example, the controller may reduce the axis error by controlling the motor based on the direct-current component of the arithmetic product.

In the second configuration described above, for example, the controller may reduce the axis error by controlling the motor such that the direct-current component converges to zero.

In the second configuration described above, for example, the current vector locus of the superposed current on the γ-δ axes may describe a figure symmetric about the γ or δ axis.

In the second configuration described above, for example, the current vector locus of the superposed current on the γ-δ axes describes a perfect circle, or an ellipse having the minor or major axis thereof on the γ axis, or a line segment on the γ or δ axis.

In the second configuration described above, for example, the motor may be a non-salient-pole motor, and the superposed current that the superposer superposes on the drive current may be a current that causes the d-axis component of the inductance of the motor to vary by magnetic saturation attributable to the γ-axis component of the superposed current.

As mentioned above, the position-sensorless motor control device having the second configuration described above can be used even with a non-salient-pole motor.

To achieve the above object, a motor drive system according to the present invention is provided with: a motor; an inverter for driving the motor; and the position-sensorless motor control device having the first or second configuration described above, which controls the motor by controlling the inverter.

As described above, with a position-sensorless motor control device, and a motor drive system incorporating it, according to the present invention, it is possible to realize position-sensorless control through very simple processing (i.e. with a very small amount of computational operation).

DETAILED DESCRIPTION OF PREFERRED EMBODIMENTS

First Embodiment

Figure 1:
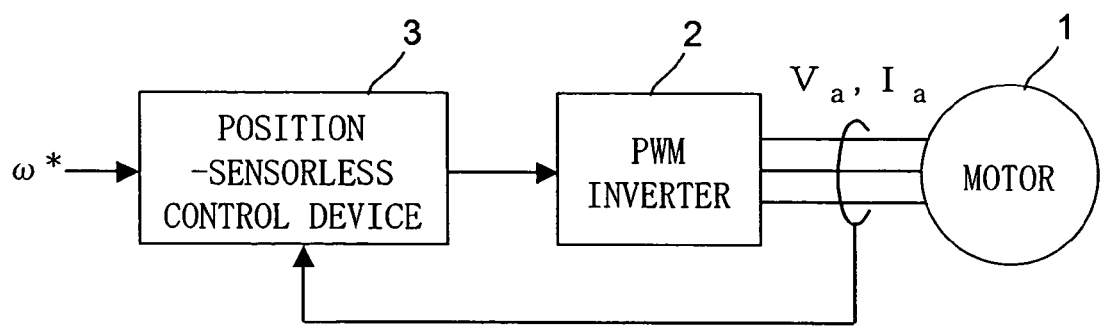
FIG. 1 is a block diagram showing the overall configuration of a motor drive system according to the present invention.

A first embodiment of the present invention will be described in detail below. FIG. 1 is a block configuration diagram of a motor drive system to which the present invention is applied. Reference numeral 1 represents a three-phase, permanent-magnet, synchronous motor 1 (hereinafter also referred to simply as "motor 1") that has a permanent magnet on the rotor (unillustrated) thereof and that has an armature winding on the stator (unillustrated) thereof. The motor 1 may be a salient-pole motor (a motor having a salient pole) or a non-salient-pole motor (a motor having no salient pole). The operation with a non-salient-pole motor will be discussed later and until then the following description mainly deals with a case where the motor 1 is a salient-pole motor (for example, an interior-permanent-magnet synchronous motor).

Reference numeral 2 represents a PWM (pulse-width modulation) inverter, which feeds the motor 1 with a three-phase alternating-current voltage, in U, V, and W phases, according to the rotor position of the motor 1. This voltage fed to the motor 1 is called the motor voltage $V_a$, and the current fed from the inverter 2 to the motor 1 is called the motor current (armature current) $I_a$.

Reference numeral 3 represents a position-sensorless control device, which estimates, based on the motor current $I_a$, the rotor position or the like of the motor 1, and feeds the inverter 2 with a signal for rotating the motor 1 at a desired rotation speed. The desired rotation speed here is fed, in the form of a specified motor speed value $\omega^*$ from an unillustrated CPU (central processing unit) or the like to the position-sensorless control device 3.

Figure 2:
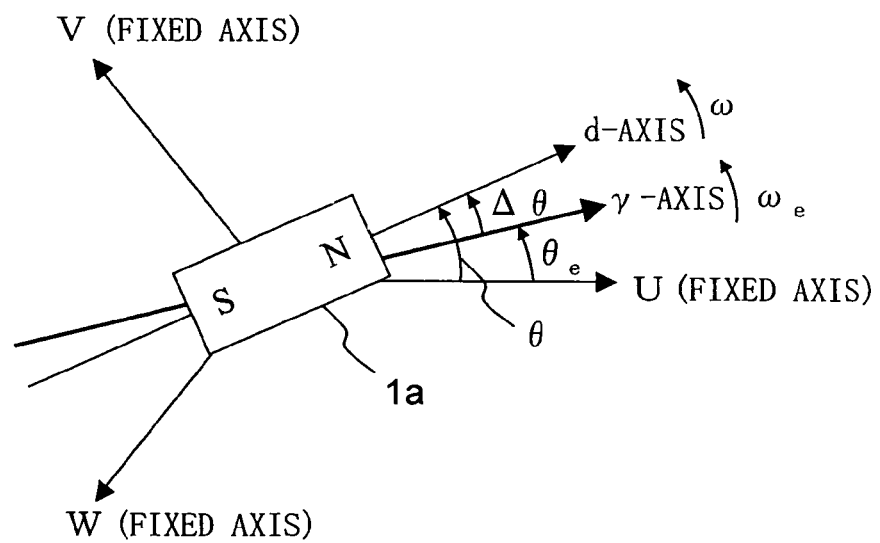
FIG. 2 is an analysis model diagram of the motor shown in FIG. 1.

FIG. 2 is an analysis model diagram of the motor 1. In the following description, what is referred to as "armature winding" always refers to that provided in the motor 1. FIG. 2 shows, as fixed axes, the U-phase, V-phase, and W-phase armature winding fixed axes. Reference numeral 1a represents the permanent magnet that forms the rotor of the motor 1. In a rotating coordinate system that rotates at the same speed as the magnetic flux reduced by the permanent magnet 1a, the direction of the magnetic flux produced by the permanent magnet 1a is called the d axis, and the axis estimated, for the purpose of control, to correspond to the d axis is called the γ axis. Though omitted from illustration, the axis that leads the d axis by an electrical angle of 90 degrees in phase is called the q axis, and the axis estimated to lead the γ axis by an electrical angle of 90 degrees in phase is called the δ axis. The rotating coordinate system has, as its coordinate axes, the d and q axes, which are collectively called the d-q axes. The rotating coordinate system estimated for the purpose of control (estimated rotating coordinate system) has, as its coordinate axes, the γ and δ axis, which are collectively called the γ-δ axes.

The d-q axes rotates, and their rotation speed is called the real motor speed ω. The γ-δ axes also rotates, and their rotation speed is called the estimated motor speed $\omega_e$. With respect to the rotating d-q axes, the phase of the d axis at a given moment is represented by θ (the real rotor position θ) relative to the U-phase armature winding fixed axis. Likewise, with respect to the rotating γ-δ axes, the phase of the γ axis at a given moment is represented by $\theta_e$ (the estimated rotor position $\theta_e$) relative to the U-phase armature winding fixed axis. Then the axis error Δθ between the d axis and the γ axis (the axis error Δθ between the d-q axes and the γ-δ axes) is expressed by $\Delta\theta=\theta-\theta_e$.

In the following description, the γ-axis component, the δ-axis component, the d-axis component, and the q-axis component of the motor voltage $V_a$ are called the γ-axis voltage $v_\gamma$, the δ-axis voltage $v_\delta$, the d-axis voltage $V_d$, and the q-axis voltage $V_q$, respectively; and the γ-axis component, the δ-axis component, the d-axis component, and the q-axis component of the motor current $I_a$ are called the γ-axis current $i_\gamma$, the δ-axis current $i_\delta$, the d-axis current $i_d$, and the q-axis current $i_q$, respectively.

Moreover, in the following description, $R_a$ represents the motor resistance (the resistance of the armature winding of the motor 1); $L_d$ and $L_q$ represents the d-axis inductance and the q-axis inductance (the d-axis component and the q-axis component of the inductance of the armature winding of the motor 1), respectively; and $\Phi_a$ represents the armature flux linkage attributable to the permanent magnet 1a. These values, namely $L_d$, $L_q$, $R_a$, and $\Phi_a$, are previously set at the design stage of the motor drive system. In the formulae presented hereinafter, "s" stands for the Laplace operator.

Figure 3:
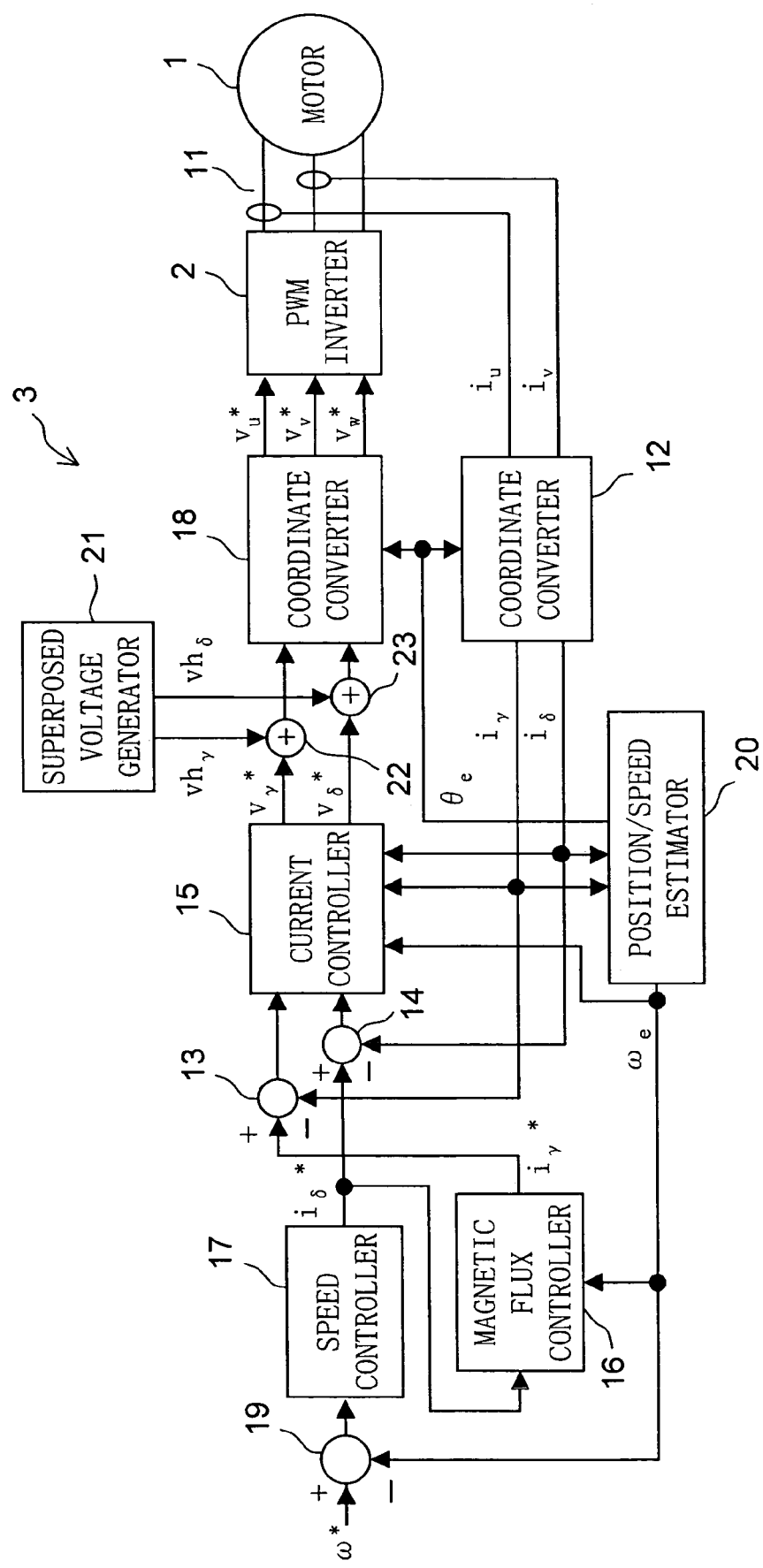
FIG. 3 is a configuration block diagram of the motor drive system of a first embodiment of the present invention.

FIG. 3 is a configuration block diagram of the motor drive system, showing in detail the internal configuration of the position-sensorless control device 3 shown in FIG. 1. The position-sensorless control device 3 is composed of a current detector 11, a coordinate converter 12, a subtracter 13, a subtracter 14, a current controller 15, a magnetic flux controller 16, a speed controller 17, a coordinate converter 18, a subtracter 19, a position/speed estimator (hereinafter also referred to simply as "estimator") 20, a superposed voltage generator 21, and adders 22 and 23. The individual functional blocks of the position-sensorless control device 3 can freely use, whenever necessary, all the values generated within the position-sensorless control device 3.

The current detector 11 is implemented with, for example, a Hall device, and detects the U-phase current $i_u$ and the V-phase current $i_v$ of the motor current $I_a$ fed from the PWM inverter 2 to the motor 1. The detection results from the current detector 11, namely the U-phase current $i_u$ and the V-phase current $i_v$, are fed to the coordinate converter 12, which then converts them, by using the estimated rotor position $\theta_e$ fed from the estimator 20, into a γ-axis current $i_\gamma$ and a δ-axis current $i_\delta$. The conversion here is performed according to formula (1) below.

$$\begin{bmatrix} i_\gamma \\ i_\delta \end{bmatrix} = \sqrt{2}\begin{bmatrix} \sin(\theta_e + \pi/3) & \sin\theta_e \\ \cos(\theta_e + \pi/3) & \cos\theta_e \end{bmatrix}\begin{bmatrix} i_u \\ i_v \end{bmatrix} \quad (1)$$

The estimator 20 estimates and outputs the estimated rotor position $\theta_e$ and the estimated motor speed $\omega_e$. How the estimated rotor position $\theta_e$ and the estimated motor speed $\omega_e$ are estimated here will be described later.

The subtracter 19 subtracts the estimated motor speed $\omega_e$ fed from the estimator 20 from the specified motor speed value $\omega^*$, and outputs the subtraction result (speed error). Based on this subtraction result ($\omega^*-\omega_e$) from the subtracter 19, the speed controller 17 produces a specified δ-axis current value $i_\delta^*$. This specified δ-axis current value $i_\delta^*$ represents the value to be kept up with by the δ-axis current $i_\delta$, i.e. the δ-axis component of the motor current $I_a$. By using the estimated motor speed $\omega_e$ fed from the estimator 20 and the specified δ-axis current value $i_\delta^*$ fed from the speed controller 17, the magnetic flux controller 16 produces a specified γ-axis current value $i_\gamma^*$. This specified γ-axis current value $i_\gamma^*$ represents the value to be kept up with by the γ-axis current $i_\gamma$, i.e. the γ-axis component of the motor current $I_a$.

The subtracter 13 subtracts the γ-axis current $i_\gamma$ outputted from the coordinate converter 12 from the specified γ-axis current value $i_\gamma^*$ outputted from the magnetic flux controller 16 to calculate the current error ($i_\gamma^*-i_\gamma$). The subtracter 14 subtracts the δ-axis current $i_\delta$ outputted from the coordinate converter 12 from the specified δ-axis current value $i_\delta^*$ outputted from the speed controller 17 to calculate the current error ($i_\delta^*-i_\delta$).

The current errors calculated by the subtracters 13 and 14, the γ-axis current $i_\gamma$ and the δ-axis current $i_\delta$ from the coordinate converter 12, and the estimated motor speed $\omega_e$ from the estimator 20 are fed to the current controller 15, which then outputs a specified γ-axis voltage value $v_\gamma^*$ and a specified δ-axis voltage value $v_\delta^*$ such that the γ-axis current $i_\gamma$ keeps up with the specified γ-axis current value $i_\gamma^*$ and that the δ-axis current $i_\delta$ keeps up with the specified δ-axis current value $i_\delta^*$.

The superposed voltage generator 21 outputs a superposed voltage to be superposed on the specified γ-axis voltage value $v_\gamma^*$ and the specified δ-axis voltage value $v_\delta^*$. The superposed voltage consists of, as a γ-axis component and a δ-axis component thereof, a γ-axis superposed voltage $vh_\gamma$ and a δ-axis superposed voltage $vh_\delta$. The superposed voltage will be described in detail later.

The adder 22 calculates the sum ($v_\gamma^*+vh_\gamma$) of the specified γ-axis voltage value $v_\gamma^*$ from the current controller 15 and the γ-axis superposed voltage $vh_\gamma$ from the superposed voltage generator 21. The adder 23 calculates the sum $(v_\delta^* + vh_\delta)$ of the specified δ-axis voltage value $v_\delta^*$ from the current controller 15 and the δ-axis superposed voltage $vh_\delta$ from the superposed voltage generator 21. Based on the estimated rotor position $\theta_e$ fed from the estimator 20, the coordinate converter 18 converts backward the specified γ-axis voltage value $v_\gamma$ having the γ-axis superposed voltage $vh_\gamma$ superposed thereon and the specified δ-axis voltage value $v_\delta^*$ having the δ-axis superposed voltage $vh_\delta$ superposed thereon; thereby the coordinate converter 18 produces specified three-phase voltage values consisting of a specified U-phase voltage value $v_u^*$, a specified V-phase voltage value $v_v^*$, and a specified W-phase voltage value $v_w^*$, which represent the U-phase component, the V-phase component, and the W-phase component of the motor voltage $V_a$, and then outputs them to the inverter 2. The backward conversion here is performed according to formula (2), consisting of two equations, below.

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* + vh_\gamma \\ v_\delta^* + vh_\delta \end{bmatrix} \quad (2)$$

$$v_w^* = -(v_u^* + v_v^*)$$

Based on the specified three-phase voltage values ($v_u^*$, $v_v^*$, and $v_w^*$), which represent the voltage to be applied to the motor 1, the inverter 2 produces pulse-width-modulated signals, and feeds the motor 1 with a motor current $I_a$ commensurate with those specified three-phase voltage values to drive the motor 1. From the beginning the specified γ-axis voltage value $v_\gamma^*$ and the specified δ-axis voltage value $v_\delta^*$ represent the voltage values to be kept up with by the γ-axis voltage $v_\gamma$ and the δ-axis voltage $v_\delta$, which are the γ-axis component and the δ-axis component of the motor voltage $V_a$, respectively; as a result of the above-described superposition of the superposed voltage, now the γ-axis voltage $v_\gamma$ and the δ-axis voltage $v_\delta$ keep up with $(v_\gamma^* + vh_\gamma)$ and $(v_\delta^* + vh_\delta)$, respectively.

When the γ-axis superposed voltage $vh_\gamma$ and the δ-axis superposed voltage $vh_\delta$ are both zero, the motor current $I_a$ is commensurate only with the specified γ-axis current value $i_\gamma^*$ and the specified δ-axis current value $i_\delta^*$. The current represented by the specified γ-axis current value $i_\gamma^*$ and the specified δ-axis current value $i_\delta^*$ is the drive current with which the motor 1 is driven. On the other hand, the specified γ-axis voltage value $v_\gamma^*$ and the specified δ-axis voltage value $v_\delta^*$ are produced based on the specified γ-axis current value $i_\gamma^*$ and the specified δ-axis current value $i_\delta^*$ so that the motor 1 is driven at the desired rotation speed ($\omega^*$). Hence, the voltage represented by the specified γ-axis voltage, value $v_\gamma^*$ and the specified δ-axis voltage value $v_\delta^*$ is the drive voltage that is applied to the motor 1 to pass the drive current therethrough.

Superposing a non-zero superposed voltage (the γ-axis superposed voltage $vh_\gamma$ and the δ-axis superposed voltage $v_\gamma$) on the specified γ-axis voltage value $v_\delta^*$ and the specified δ-axis voltage value $v_\delta^*$ is equivalent to superposing the superposed voltage on the drive voltage. As a result of this superposition of the superposed voltage, the drive current has superposed thereon a superposed current commensurate with the superposed voltage.

Figure 4:
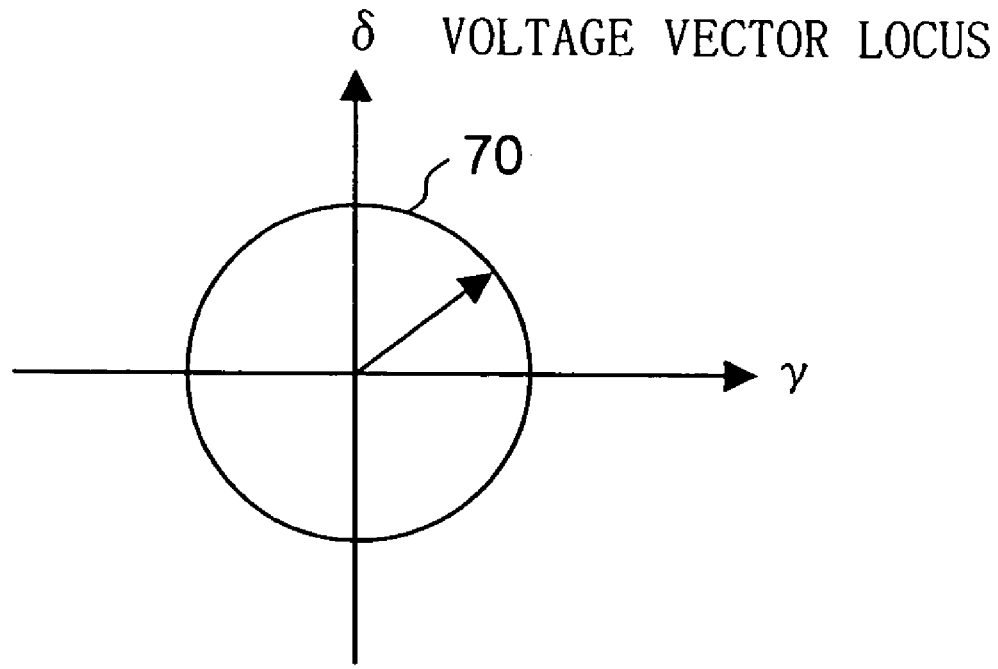
FIG. 4 is a diagram showing an example of the voltage vector locus (here, a perfect-circle voltage vector locus) of the superposed voltage outputted from the superposed voltage generator shown in FIG. 3.
Figure 11:
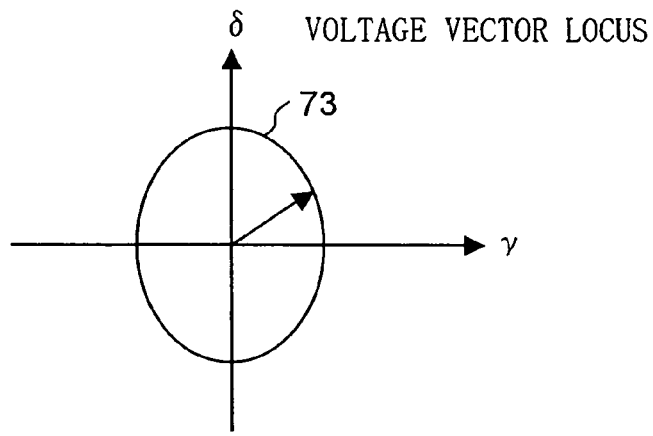
FIG. 11 is a diagram showing another example of the voltage vector locus (here, a elliptic voltage vector locus) of the superposed voltage outputted from the superposed voltage generator shown in FIG. 3.

The superposed voltage generated by the superposed voltage generator 21 is a high-frequency rotation voltage. Here, "high frequency" denotes that the frequency of the superposed voltage is sufficiently higher than that of the drive voltage. Accordingly, the frequency of the superposed current superposed commensurate with the superposed voltage is sufficiently higher than that of the drive current. Moreover, "rotation voltage" denotes a voltage of which the voltage vector locus describes a circle on the γ-δ axes (in the γ-δ coordinate system) as shown in FIGS. 4 and 11. For example, in three-phase terms, a rotation voltage is a three-phase balanced voltage, and with such a three-phase balanced voltage, its voltage vector locus describes a perfect circle having its center at the origin of the γ-δ axes, like the voltage vector locus shown in FIG. 4. Since this rotation voltage is a high-frequency voltage that is not synchronous with the motor 1, applying the rotation voltage to the motor 1 does not cause it to rotate.

Figure 5:
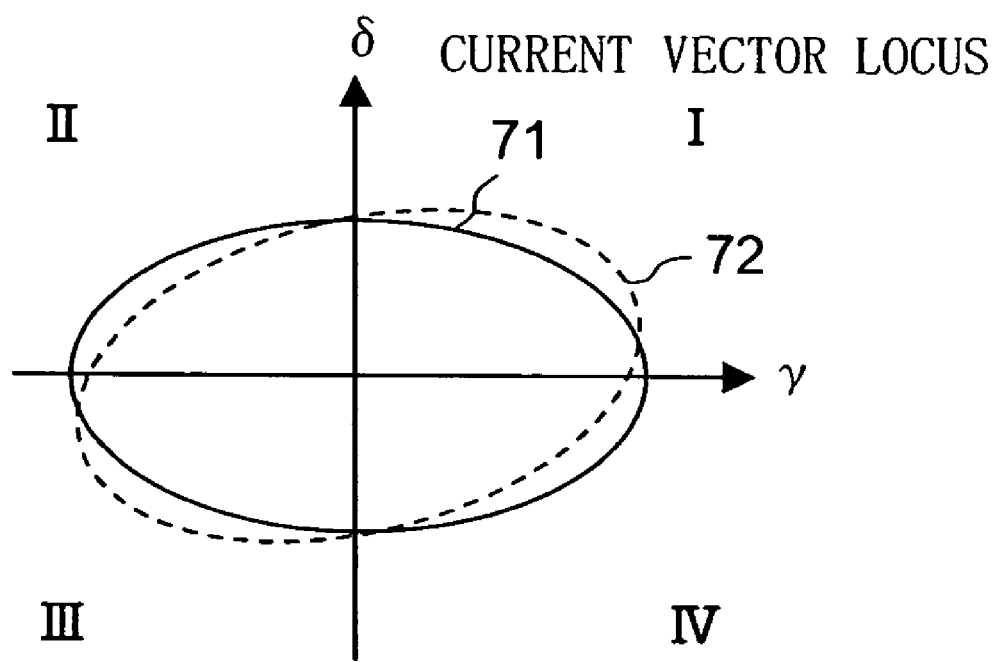
FIG. 5 is a diagram showing the current vector locus of the superposed current that flows according to the superposed voltage shown in FIG. 4.

In a case where the motor 1 is an interior-permanent-magnet synchronous motor or the like and where $L_d < L_q$ holds, the current vector locus of the superposed current that is made to flow through the motor 1 by the superposed voltage exhibiting the voltage vector locus 70 describes, as indicated by a current vector locus 71 in FIG. 5, an ellipse that has its center at the origin on the γ-δ axes (in the γ-δ coordinate system) and that has its major-axis direction running on the γ-axis direction and its minor-axis direction running on the δ-axis direction. It should be noted that the current vector locus 71 is one observed when the axis error $\Delta\theta$ is zero. When the axis error $\Delta\theta$ is non-zero, the current vector locus of the superposed current describes an ellipse as indicated by a current vector locus 72, and its major-axis direction (or minor-axis direction) does not coincide with the γ-axis (or δ-axis) direction. That is, when the axis error $\Delta\theta$ is non-zero, on the γ-δ axes (in the γ-δ coordinate system), the current vector locus 71 is inclined about the origin so as to describe the current vector locus 72 instead.

Let the γ-axis component and the δ-axis component of the superposed current be called the γ-axis superposed current $ih_\gamma$ and the δ-axis superposed current $ih_\delta$, respectively. Then their arithmetic product $(ih_\gamma \times ih_\delta)$ contains a direct-current component that depends on the inclination of the ellipse described by the current vector locus 72. The arithmetic product $(ih_\gamma \times ih_\delta)$ is positive in the first and third quadrants of the current vector locus and negative in the second and fourth quadrants thereof. Thus, when the ellipse is not inclined (when the current vector locus 71 is observed), the arithmetic product contains no direct-current component; when the ellipse is inclined (when the current vector locus 72 is observed), the arithmetic product contains a direct-current component. In FIG. 5 and like figures, the roman numerals I, II, III, and IV represent the first, second, third, and fourth quadrants on the γ-δ axes (in the γ-δ coordinate system).

Figure 6:
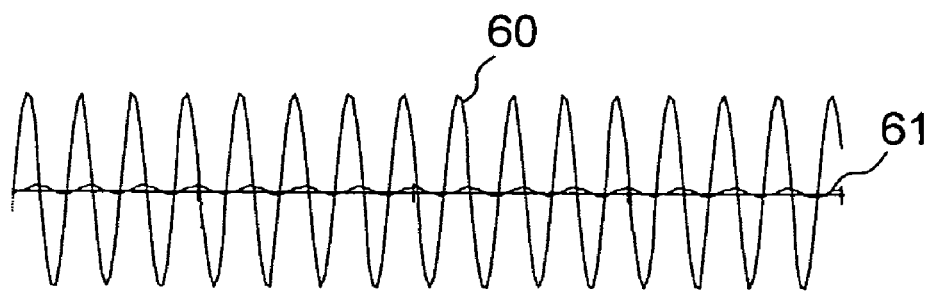
FIG. 6 is a waveform diagram showing the arithmetic product of the γ-axis and δ-axis components of the superposed current and the direct-current component of the arithmetic product (in a case where the axis error is zero)
Figure 7:
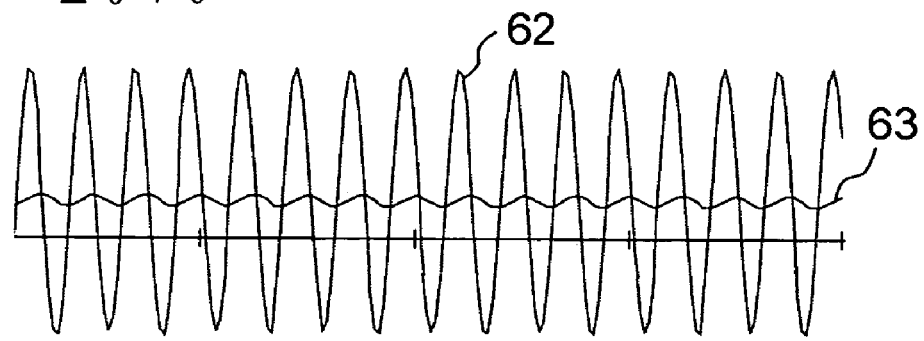
FIG. 7 is a waveform diagram showing the arithmetic product of the γ-axis and δ-axis components of the superposed current and the direct-current component of the arithmetic product (in a case where the axis error is non-zero)

In FIG. 6, where the horizontal axis represents time, the arithmetic product $(ih_\gamma \times ih_\delta)$ and the direct-current component contained therein as observed when the axis error $\Delta\theta$ is zero are indicated by curves 60 and 61, respectively. In FIG. 7, where the horizontal axis represents time, the arithmetic product $(ih_\gamma \times ih_\delta)$ and the direct-current component contained therein as observed when the axis error $\Delta\theta$ is non-zero are indicated by curves 62 and 63, respectively. As will be understood from FIGS. 6 and 7, the direct-current component of the arithmetic product $(ih_\gamma \times ih_\delta)$ is zero when $\Delta\theta = 0°$ and is non-zero when $\Delta\theta \neq 0°$. Moreover, the direct-current component increases as the magnitude of the axis error $\Delta\theta$ increases (is largely proportional to the axis error $\Delta\theta$). Thus, when the direct-current component is so controlled as to converge to zero, the axis error $\Delta\theta$ converges to zero.

Figure 8:
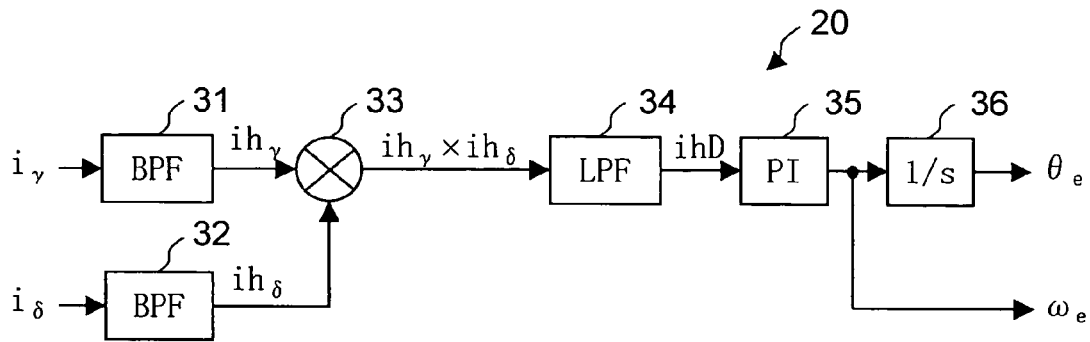
FIG. 8 is a block diagram showing an example of the internal configuration of the position/speed estimator shown in FIG. 3.

Exploiting this relationship, the estimator 20 corrects the γ-δ axes so that the direct-current component of the arithmetic product ($ih_\gamma \times ih_\delta$) converges to zero, and thereby estimates the estimated rotor position $\theta_e$ and the estimated motor speed $\omega_e$. FIG. 8 is a block diagram showing an example of the internal configuration of the estimator 20. The estimator 20 shown in FIG. 8 is composed of band-pass filters (hereinafter abbreviated to "BPFs") 31 and 32, a multiplier 33, a low-pass filter (hereinafter abbreviated to "LPF") 34, a proportional-plus-integral calculator 35, and an integrator 36.

The BPF 31 extracts, from the value of the γ-axis current $i_\gamma$ outputted from the coordinate converter 12, the γ-axis superposed current $ih_\gamma$, which is the component superposed thereon. Likewise, the BPF 32 extracts, from the value of the δ-axis current $i_\delta$ outputted from the coordinate converter 12, the δ-axis superposed current $ih_\delta$, which is the component superposed thereon. The multiplier 33 calculates the arithmetic product ($ih_\gamma \times ih_\delta$) of the γ-axis superposed current $ih_\gamma$ and the δ-axis superposed current $ih_\delta$ extracted by the BPFs 31 and 32. The LPF 34 removes a high-frequency component from the arithmetic product ($ih_\gamma \times ih_\delta$), and thereby extracts the direct-current component ihD of the arithmetic product ($ih_\gamma \times ih_\delta$).

To achieve PLL (phase-locked loop) control, the proportional-plus-integral calculator 35, while cooperating with the individual functional blocks of the position-sensorless control device 3, performs proportional-plus-integral control, and thereby calculates the estimated motor speed $\omega_e$ such that the direct-current component ihD outputted from the LPF 34 converges to zero (i.e. so that the axis error $\Delta\theta$ converges to zero). The integrator 36 integrates the estimated motor speed $\omega_e$ outputted from the proportional-plus-integral calculator 35 to calculate the estimated rotor position $\theta_e$. The estimated motor speed $\omega_e$ outputted from the proportional-plus-integral calculator 35 and the estimated rotor position $\theta_e$ outputted from the integrator 36 are both, as the output values of the estimator 20, fed to the relevant functional blocks of the position-sensorless control device 3 that need them.

With the configuration shown in FIGS. 3 and 8, the axis error $\Delta\theta$ can be made to converge to zero. Moreover, here, the processing required to estimate the rotor position is simpler (the amount of computational operation required to do that is smaller) than is conventionally required, and is easy to realize. This offers high practicality. In particular, when the motor 1 is at standstill or is rotating at low speed, the rotor position can be properly estimated. Needless to say, no position sensor (unillustrated) any longer needs to be provided in the motor drive system. This is expected to lead to reduced cost and other benefits.

Figure 9:
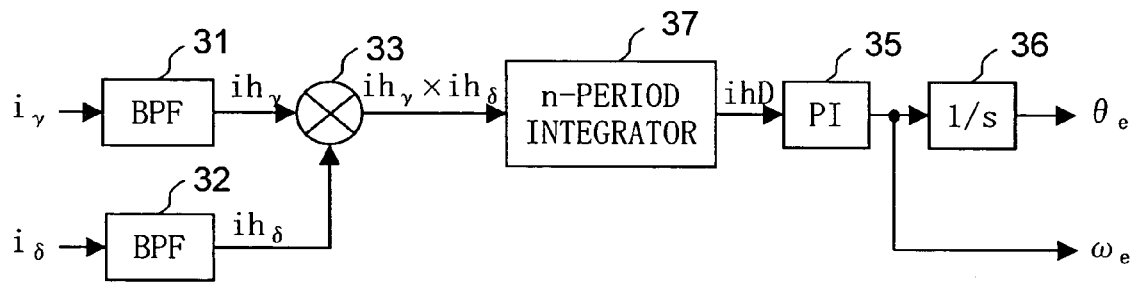
FIG. 9 is a block diagram showing another example of the internal configuration of the position/speed estimator shown in FIG. 3.
Figure 10:
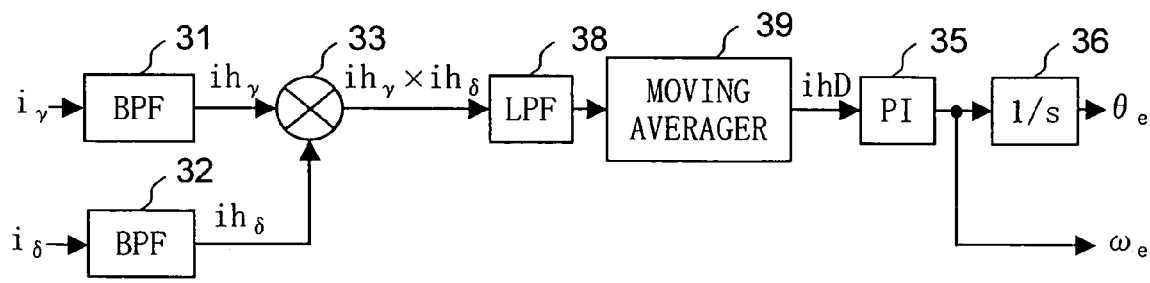
FIG. 10 is a block diagram showing another example of the internal configuration of the position/speed estimator shown in FIG. 3.

As shown in FIG. 9, instead of the LPF 34, an n-period integrator 37 that integrates the arithmetic product ($ih_\gamma \times ih_\delta$) of n-period worth (where n is an integer equal to or greater than one) of the superposed voltage may be used to extract the direct-current component ihD. The n-period integrator 37 may be further replaced with a moving averager (unillustrated) that calculates the direct-current component ihD from the moving averages of the arithmetic product ($ih_\gamma \times ih_\delta$) of n-period worth of the superposed voltage. As a method for extracting the direct-current component ihD from the arithmetic product ($ih_\gamma \times ih_\delta$), it is possible even to adopt a combination of more than one of the following methods: low-pass filtering, integration (n-period integration), moving averaging, etc. For example, as shown in FIG. 10, the LPF 34 in FIG. 8 may be replaced with an LPF 38 and a moving averager 39. Here, the LPF 38 is like the LPF 34. The moving averager 39 calculates the moving averages (the moving averages of n-period worth of the superposed voltage) of the arithmetic product ($ih_\gamma \times ih_\delta$) having the high-frequency component removed therefrom by the LPF 38, and thereby calculates the direct-current component ihD. In FIGS. 9 and 10, such parts as are found also in FIG. 8 are identified by common reference numerals, and no overlapping description will be repeated.

The example described above deals with a case where the voltage vector locus of the superposed voltage describes, on the γ-δ axes, a perfect circle having its center at the origin, like the voltage vector locus 70 shown in FIG. 4. In a case where a two-phase rotation voltage is used as the superposed voltage, the amplitude of the γ-axis superposed voltage $vh_\gamma$ and the amplitude of the δ-axis superposed voltage $vh_\delta$ may be different. FIG. 11 shows the voltage vector locus 73 of a two-phase rotation voltage used as the superposed voltage, as observed in a case where the amplitude of the δ-axis superposed voltage $vh_\delta$ is made greater than the amplitude of the γ-axis superposed voltage $vh_\gamma$. The voltage vector locus 73 describes an ellipse that has its center at the origin on the γ-δ axes (in the γ-δ coordinate system) and that has its minor-axis direction running on the γ-axis direction and its major-axis direction running on the δ-axis direction.

Figure 12:
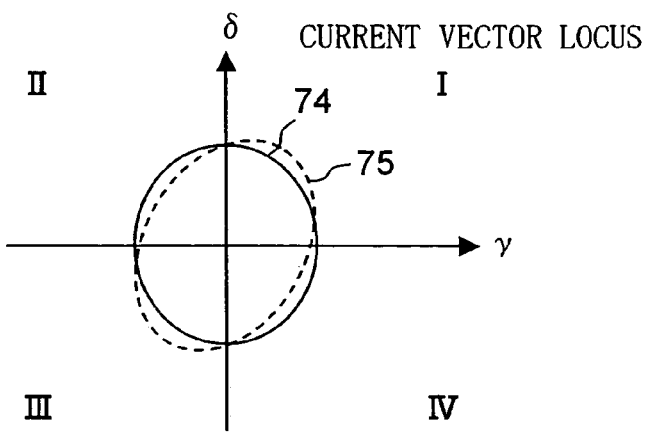
FIG. 12 is a diagram showing the current vector locus of the superposed current that flows according to the superposed voltage shown in FIG. 11.

When the superposed voltage indicated by the voltage vector locus 73 is superposed, the current vector locus of the superposed current that flows as a result describes an ellipse elongate in the δ-axis direction as shown in FIG. 12. In this case also, when the axis error $\Delta\theta$ is zero, the current vector locus of the superposed current describes, as indicated by a current vector locus 74, an ellipse (or a perfect circle in some cases) that has its center at the origin on the γ-δ axes (in the γ-δ coordinate system) and that has its major-axis or minor-axis direction running on the γ-axis direction; thus, the arithmetic product ($ih_\gamma \times ih_\delta$) contains no direct-current component. In contrast, when the axis error $\Delta\theta$ is non-zero, the current vector locus of the superposed current is inclined about the origin, as from the current vector locus 74 to a current vector locus 75; thus, the arithmetic product ($ih_\gamma \times ih_\delta$) contains a direct-current component (except when the current vector locus of the superposed current describes a perfect circle). Thus, the estimator 20 shown in FIG. 8 etc. can estimate the rotor position.

It is possible even to adopt a single-phase alternating voltage as the superposed voltage. For example, of the γ-axis superposed voltage $vh_\gamma$ and the δ-axis superposed voltage $vh_\delta$, only the δ-axis superposed voltage $vh_\delta$ may be made zero, in which case the superposed voltage is a single-phase high-frequency voltage (a high-frequency alternating voltage in the γ phase) consisting only of a γ-axis voltage component; or only the γ-axis superposed voltage $vh_\gamma$ may be made zero, in which case the superposed voltage is a single-phase high-frequency voltage (a high-frequency alternating voltage in the δ phase) consisting only of a δ-axis voltage component. Since this single-phase alternating voltage also is a high-frequency voltage that is not synchronous with the motor 1, applying the alternating voltage to the motor 1 does not cause it to rotate.

Figure 13:
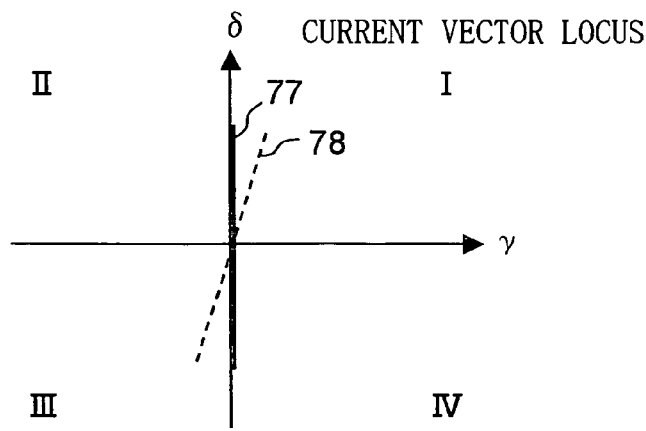
FIG. 13 is a diagram showing the current vector locus of the superposed current in a case where the superposed voltage outputted from the superposed voltage generator shown in FIG. 3 is a single-phase alternating voltage.

For example, in a case where, of the γ-axis superposed voltage $vh_\gamma$ and the δ-axis superposed voltage $vh_\delta$, only the γ-axis superposed voltage $vh_\gamma$ is made zero, the voltage vector locus of the superposed voltage describes a line segment having its mid point at the origin on the γ-δ axes (in the γ-δ coordinate system) and lying on the δ-axis. In this case also, when the axis error $\Delta\theta$ is zero, the current vector locus of the superposed current describes a line segment having its mid point at the origin on the γ-δ axes (in the γ-δ coordinate system) as indicated by a current vector locus 77 in FIG. 13; thus, the arithmetic product ($ih_\gamma \times ih_\delta$) contains no direct-current component. In contrast, when the axis error $\Delta\theta$ is non-zero, the current vector locus of the superposed current is inclined about the origin, as from a current vector locus 77 to a current vector locus 78; thus, the arithmetic product ($ih_\gamma \times ih_\delta$) contains a direct-current component. Thus, the estimator 20 shown in FIG. 8 etc. can estimate the rotor position.

What relationship to set between the amplitude of the $\gamma$-axis superposed voltage $vh_\gamma$ and the amplitude of the $\delta$-axis superposed voltage $vh_\delta$ in a case where a two-phase rotation voltage is adopted as the superposed voltage, or what single-phase alternating voltage to adopt as the superposed voltage, is decided appropriately according to the characteristics of the motor 1 and the situation in which the motor drive system is used. Relatively increasing the amplitude of the $\gamma$-axis superposed voltage $vh_\gamma$ (i.e. relatively decreasing the amplitude of the $\delta$-axis superposed voltage $vh_\delta$) in a two-phase rotation voltage reduces the current component associated with the torque, and thus advantageously makes the torque pulsation attributable to the superposition less likely; simultaneously, however, it increases the current component unassociated with the torque, and thus disadvantageously makes the influence of the magnetic saturation attributable to the superposition more likely to appear. The same is true also when a single-phase high-frequency voltage consisting only of a $\gamma$-axis voltage component is adopted as the superposed voltage.

In contrast, relatively increasing the amplitude of the $\delta$-axis superposed voltage $vh_\delta$ (i.e. relatively decreasing the amplitude of the $\gamma$-axis superposed voltage $vh_\gamma$) in a two-phase rotation voltage reduces the current component unassociated with the torque, and thus advantageously makes the influence of the magnetic saturation attributable to the superposition less likely to appear; simultaneously, however, it increases the current component associated with the torque, and thus disadvantageously makes the torque pulsation attributable to the superposition more likely. The same is true also when a single-phase high-frequency voltage consisting only of a $\delta$-axis voltage component is adopted as the superposed voltage.

On the other hand, adopting as the superposed voltage a two-phase rotation voltage in which the amplitude of the $\gamma$-axis superposed voltage $vh_\gamma$ and the amplitude of the $\delta$-axis superposed voltage $vh_\delta$ differs, or adopting as the superposed voltage a single-phase alternating voltage, makes it possible to reduce the increase in electric power consumption attributable to the superposition more than adopting a rotation voltage that describes a perfect circle as shown in FIG. 4. To keep the axis error $\Delta\theta$ accurately zero, a superposed current of a certain magnitude needs to be superposed. By appropriately setting the relationship between the amplitude of the $\gamma$-axis superposed voltage $vh_\gamma$ and the amplitude of the $\delta$-axis superposed voltage $vh_\delta$ according to the characteristics of the motor 1 and other factors, or by adopting a single-phase alternating voltage according to the characteristics of the motor 1 and other factors, it is possible to reduce the increase in electric power consumption attributable to the superposition.

To obtain a two-phase rotation voltage as the superposed voltage, it is necessary that the $\gamma$-axis superposed voltage $vh_\gamma$ and the $\delta$-axis superposed voltage $vh_\delta$ be sine waves, but it is not always necessary that the $\gamma$-axis superposed voltage $vh_\gamma$ and/or the $\delta$-axis superposed voltage $vh_\delta$ be sine waves. So long as the voltage vector locus of the superposed voltage on the $\gamma$-$\delta$ axes (in the $\gamma$-$\delta$ coordinate system) describes a figure that encloses the origin and that is symmetric about the $\gamma$-axis or the $\delta$-axis, the $\gamma$-axis superposed voltage $vh_\gamma$ and the $\delta$-axis superposed voltage $vh_\delta$ may be given any waveforms. So long as the voltage vector locus of the superposed voltage on the $\gamma$-$\delta$ axes (in the $\gamma$-$\delta$ coordinate system) describes a figure that encloses the origin and that is symmetric about the $\gamma$-axis or the $\delta$-axis, just as in a case where a two-phase rotation voltage is adopted as the superposed voltage, when the axis error $\Delta\theta$ equals $0°$, the arithmetic product ($ih_\gamma \times ih_\delta$) contains no direct-current component and, as the magnitude of the axis error $\Delta\theta$ increases from $0°$, the direct-current component of the arithmetic product ($ih_\gamma \times ih_\delta$) increases starting with zero.

It should be understood that the above-noted expression "enclose the origin" denotes that the origin on the $\gamma$-$\delta$ axes (in the $\gamma$-$\delta$ coordinate system) lies inside the above-mentioned "figure that is symmetric". It should also be understood that the above-noted expression "symmetric about the $\gamma$-axis" denotes that, of the voltage vector locus on the $\gamma$-$\delta$ axes (in the $\gamma$-$\delta$ coordinate system), the part lying in the first and second quadrants and the part lying in the third and fourth quadrants are symmetric with each other about the $\gamma$-axis. Likewise, it should also be understood that the above-noted expression "symmetric about the $\delta$-axis" denotes that, of the voltage vector locus on the $\gamma$-$\delta$ axes (in the $\gamma$-$\delta$ coordinate system), the part lying in the first and fourth quadrants and the part lying in the second and third quadrants are symmetric with each other about the $\delta$-axis.

Figure 14:
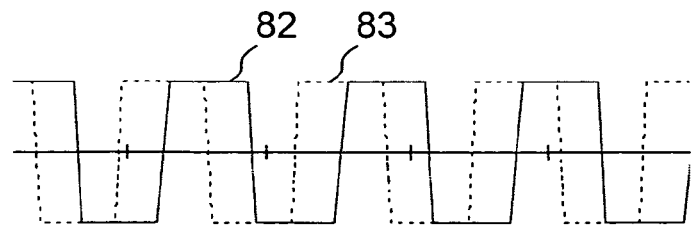
FIG. 14 is a diagram showing an example of the waveform (here, a rectangular wave) of the superposed voltage outputted from the superposed voltage generator shown in FIG. 3.
Figure 15:
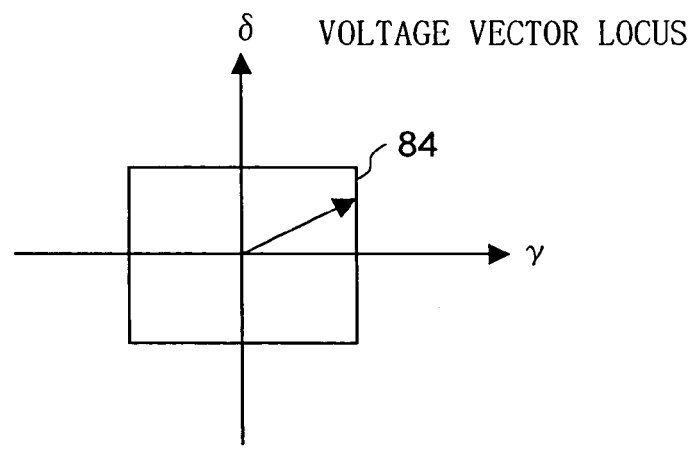
FIG. 15 is a diagram showing the voltage vector locus corresponding to the waveform shown in FIG. 14.
Figure 16:
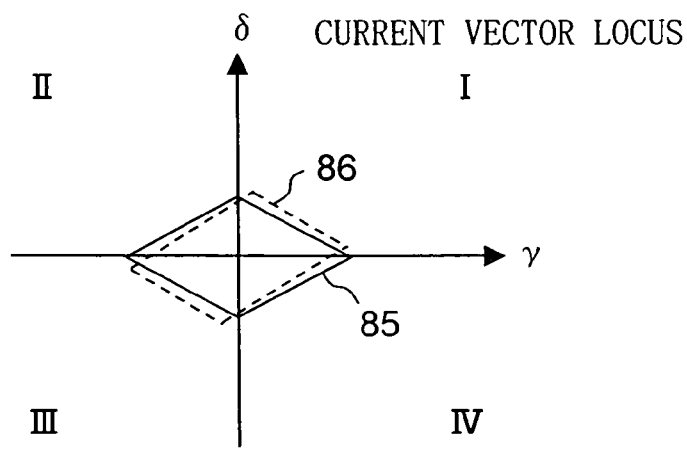
FIG. 16 is a diagram showing the current vector locus of the superposed current that flows according to the superposed voltage shown in FIG. 15.

For example, as shown in FIG. 14, the $\gamma$-axis superposed voltage $vh_\gamma$ (solid line 82) and the $\delta$-axis superposed voltage $vh_\delta$ (broken line 83) may be rectangular waves. In this case, their voltage vector locus describes a rectangular having its center at the origin on the $\gamma$-$\delta$ axes (in the $\gamma$-$\delta$ coordinate system) as indicated by a voltage vector locus 84 in FIG. 15, and the current vector locus of the superposed current that flows as a result describes (substantially) a lozenge as shown in FIG. 16. This lozenge described by the current vector locus of the superposed current is, when the axis error $\Delta\theta$ is zero, as indicated by a current vector locus 85; thus, the arithmetic product ($ih_\gamma \times ih_\delta$) contains no direct-current component. When the axis error $\Delta\theta$ is non-zero, however, the current vector locus of the superposed current changes from the current vector locus 85 to a current vector locus 86; that is, the lozenge becomes distorted, and the arithmetic product ($ih_\gamma \times ih_\delta$) comes to have a direct-current component. Thus, the estimator 20 shown in FIG. 8 etc. can estimate the rotor position.

Figure 17:
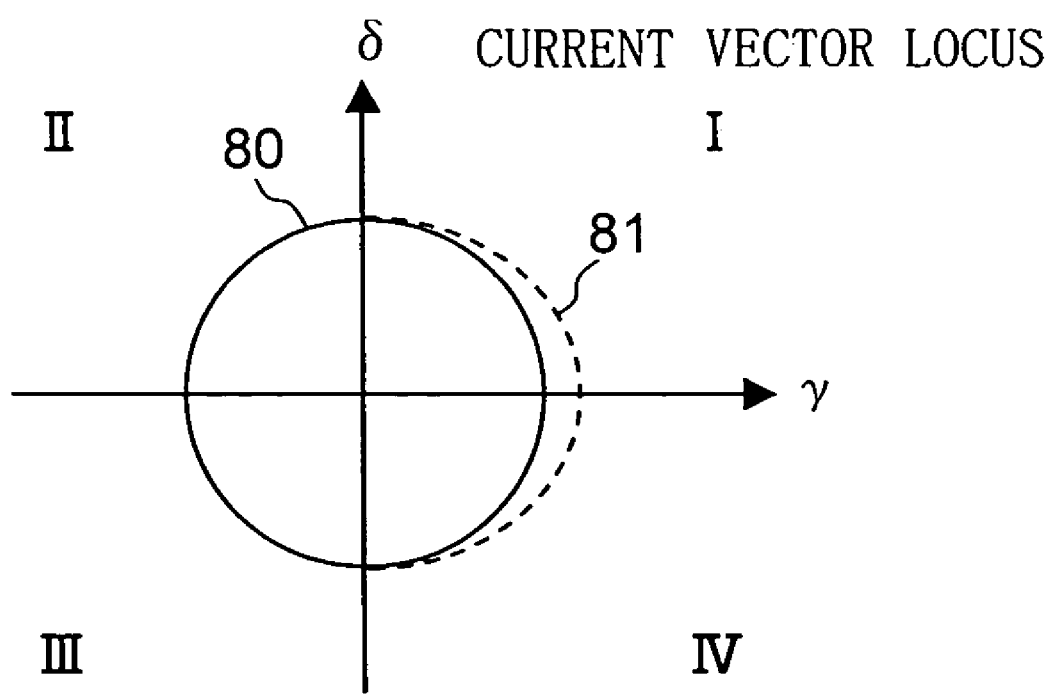
FIG. 17 is a diagram showing the current vector locus of the superposed current in a case where the motor shown in FIG. 3 is a non-salient-pole motor.

As the motor 1, a surface-permanent-magnet synchronous motor, which is a type of non-salient-pole motor, may be adopted. It should be noted, however, that, in a case where a non-salient-pole motor is used as the motor 1, when the voltage vector locus of the superposed voltage on the $\gamma$-$\delta$ axes (in the $\gamma$-$\delta$ coordinate system) describes a perfect circle, like the voltage vector locus 70 shown in FIG. 4 (i.e. when, in the rotation voltage, the amplitude of the $\gamma$-axis superposed voltage $vh_\gamma$ and the amplitude of the $\delta$-axis superposed voltage $vh_\delta$ are equal), the current vector locus of the superposed current on the $\gamma$-$\delta$ axes (in the $\gamma$-$\delta$ coordinate system) also describes a perfect circle having its center at the origin, as indicated by a current vector locus 80 in FIG. 17 (provided that no magnetic saturation is occurring). When the current vector locus of the superposed current describes a perfect circle, if the perfect circle becomes inclined as a result of the axis error $\Delta\theta$ being non-zero, the inclination cannot be grasped.

In such a case, it is advisable to increase the $\gamma$-axis component of the superposed current in such a direction as to increase the magnetic flux pointing in the same direction as the armature flux linkage $\Phi_a$ attributable to the permanent magnet 1a, in order to thereby intentionally cause magnetic saturation in the motor 1. When magnetic saturation occurs, the d-axis inductance $L_d$ decreases, making the γ-axis superposed current $ih_\gamma$ easier to flow; thus, even in a case where a superposed voltage of which the voltage vector locus describes a perfect circle is superposed, the current vector locus of the superposed current does not describe a perfect circle but bulges in the γ-axis direction as indicated by a current vector locus 81. Hence, when axis error $\Delta\theta \neq 0$, the direct-current component of the arithmetic product ($ih_\gamma \times ih_\delta$) has a non-zero value. Thus, by the same method as described above, the rotor position can be estimated.

Specifically, it is advisable to superpose a superposed voltage that causes the d-axis inductance $L_d$ of the motor 1, which is here a non-salient-pole motor, to vary by magnetic saturation attributable to the γ-axis superposed current $ih_\gamma$. With respect to the superposed voltage and the superposed current, both high-frequency, the γ-axis superposed voltage $vh_\gamma$ and the γ-axis superposed current $ih_\gamma$ are substantially proportional to each other, and the δ-axis superposed voltage $vh_\delta$ and the δ-axis superposed current $ih_\delta$ are substantially proportional to each other. This is because the voltage equation of the motor fulfills formulae (3a) and (3b) below and, at high frequencies, in the right side of both formulae (3a) and (3b), the second term is dominant while the other terms can be ignored. In formulae (3a) and (3b), p represents the differentiation operator.

$$v_d = R_a i_d + pL_d i_d - \omega L_q i_q \quad (3a)$$

$$v_q = R_a i_q + pL_q i_q + \omega L_d i_d + \omega \Phi_a \quad (3b)$$

Needless to say, even in a case where a non-salient-pole motor is adopted as the motor 1, a two-phase rotation voltage in which the amplitude of the γ-axis superposed voltage $vh_\gamma$ and the amplitude of the δ-axis superposed voltage $vh_\delta$ differ may be adopted as the superposed voltage, or a single-phase alternating voltage may be adopted as the superposed voltage. To exploit the magnetic saturation attributable to the γ-axis superposed current $ih_\gamma$, however, the γ-axis superposed voltage $vh_\gamma$ (the γ-axis superposed current $ih_\gamma$) should not be zero.

The current controller 15 performs necessary computational operation according to two formulae (4a) and (4b) below. The magnetic flux controller 16, the speed controller 17, and the proportional-plus-integral calculator 35 perform necessary computational operation according to formulae (5), (6), and (7), respectively.

$$v_\gamma^* = \left(K_{cp} + \frac{K_{ci}}{s}\right)(i_\gamma^* - i_\gamma) - \omega_e L_q i_\delta \quad (4a)$$

$$v_\delta^* = \left(K_{cp} + \frac{K_{ci}}{s}\right)(i_\delta^* - i_\delta) + \omega_e (L_d i_\gamma + \Phi_a) \quad (4b)$$

$$i_\gamma^* = \frac{\Phi_a}{2(L_q - L_d)} - \sqrt{\frac{\Phi_a^2}{4(L_q - L_d)^2} + i_\delta^{*2}} \quad (5)$$

$$i_\delta^* = (K_{sp} + K_{si}/s) \cdot (\omega^* - \omega_e) \quad (6)$$

$$\omega_e = (K_p + K_i/s) \cdot ihD \quad (7)$$

In these formulae, $K_{cp}$, $K_{sp}$, and $K_p$ represent constants of proportionality (proportional gains), and $K_{ci}$, $K_{si}$, and $K_i$ represent constants of integration (integral gains). These constants are all previously set at the design stage of the motor drive system.

In the example described above, the superposed voltage is superposed on the input side (namely $v_\gamma^*$ and $v_\delta^*$) of the coordinate converter 18; instead, it may be superposed on the output side (namely $v_U^*$, $v_V^*$, and $v_W^*$) of the coordinate converter 18. In this case, the values obtained by converting the γ-axis superposed voltage $vh_\gamma$ and the δ-axis superposed voltage $vh_\delta$ into a three-phase voltage are superposed on the specified three-phase voltage values ($v_u^*$, $v_v^*$, and $v_w^*$).

Second Embodiment

Figure 18:
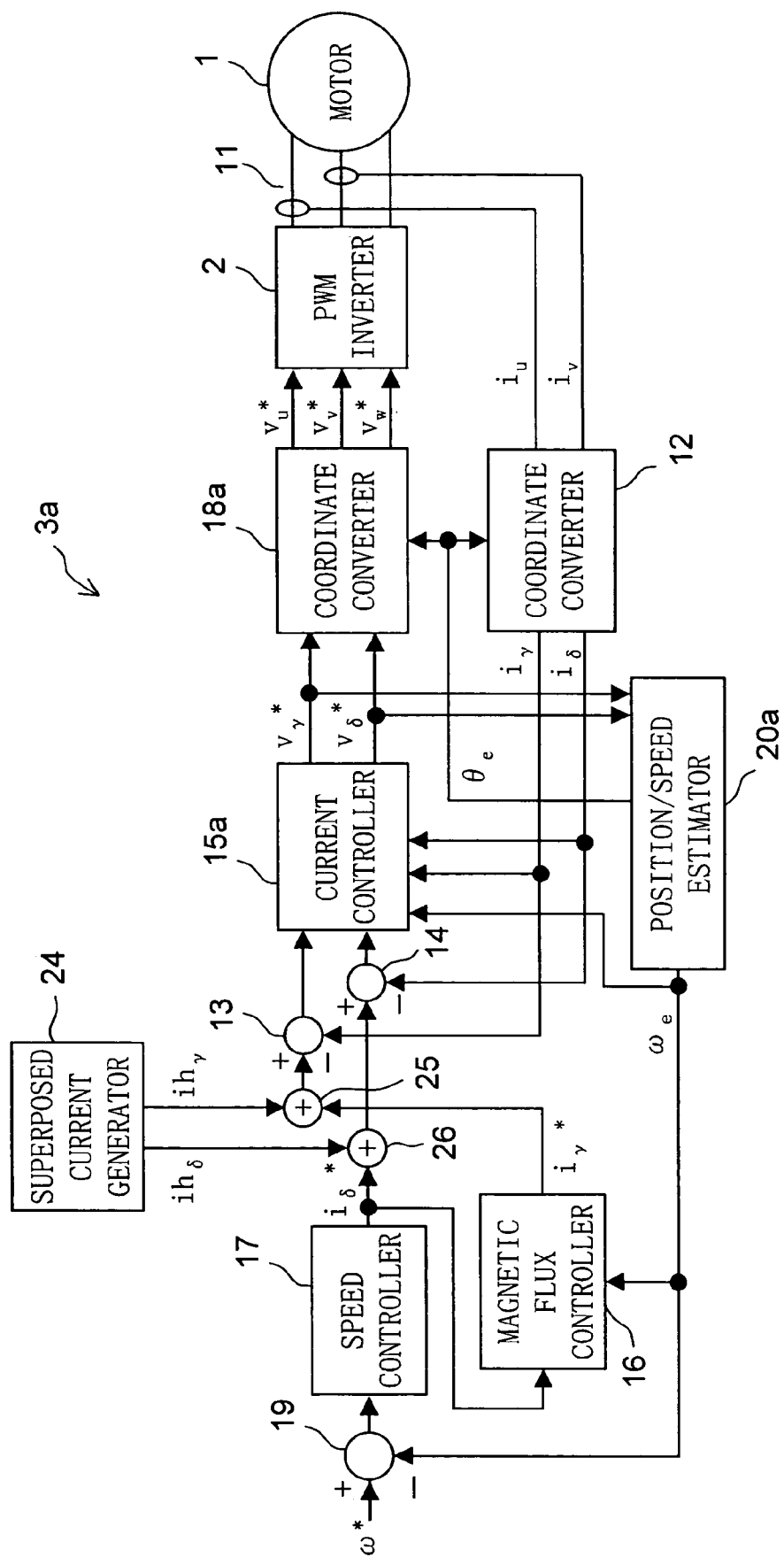
FIG. 18 is a configuration block diagram of the motor drive system of a second embodiment of the present invention.

Next, a second embodiment of the present invention will be described in detail. FIG. 18 is a detailed configuration block diagram of the motor drive system of the second embodiment. The motor drive system of the second embodiment is composed of a motor 1, an inverter 2, and a position-sensorless control device 3a. The position-sensorless control device 3a here differs from the position-sensorless control device 3 shown in FIG. 3 in that the superposed voltage generator 21 and the adders 22 and 23 of the latter are replaced with a superposed current generator 24 and adders 25 and 26, and that the position/speed estimator 20, the current controller 15, and the coordinate converter 18 provided in the latter are replaced with a position/speed estimator 20a (hereinafter also referred to simply as "estimator 20a"), a current controller 15a, and a coordinate converter 18a, respectively. In other respects, the position-sensorless control device 3a here has basically the same configuration as the position-sensorless control device 3 shown in FIG. 3. In FIG. 18, such parts are found also in FIG. 3 are identified by common reference numerals, and in principle no overlapping description will be repeated.

In the second embodiment also, the motor 1 may be a salient-pole motor (a motor having a salient pole) or a non-salient-pole motor (a motor having no salient pole). The following description mainly deals with a case where the motor 1 is a salient-pole motor (for example, an interior-permanent-magnet synchronous motor).

In the second embodiment, the estimator 20a estimates and outputs the estimated rotor position $\theta_e$ and the estimated motor speed $\omega_e$. Thus, the individual functional blocks of the position-sensorless control device 3a perform necessary computational operation by using, whenever necessary, the estimated rotor position $\theta_e$ and the estimated motor speed $\omega_e$ estimated by the estimator 20a. The individual functional blocks of the position-sensorless control device 3a can freely use, whenever necessary, all the values generated within the position-sensorless control device 3a.

The subtracter 19 subtracts the estimated motor speed $\omega_e$ fed from the estimator 20a from the specified motor speed value $\omega^*$, and outputs the subtraction result (speed error). Based on this subtraction result ($\omega^* - \omega_e$) from the subtracter 19, the speed controller 17 produces a specified δ-axis current value $i_\delta^*$. By using the estimated motor speed $\omega_e$ fed from the estimator 20a and the specified δ-axis current value $i_\delta^*$ fed from the speed controller 17, the magnetic flux controller 16 produces a specified γ-axis current value $i_\gamma^*$.

The superposed current generator 24 outputs the superposed current to be superposed on the specified γ-axis current value $i_\gamma^*$ and the specified δ-axis current value $i_\delta^*$. The superposed current consists of, as a γ-axis component and a δ-axis component thereof, a γ-axis superposed current $ih_\gamma$ and a δ-axis superposed current $ih_\delta$. The superposed current will be described in detail later.

The adder 25 calculates the sum $(i_\gamma^* + ih_\gamma)$ of the specified $\gamma$-axis current value $i_\gamma^*$ from the magnetic flux controller 16 and the $\gamma$-axis superposed current $ih_\gamma$ from the superposed current generator 24. The adder 26 calculates the sum $(i_\delta^* + ih_\delta)$ of the specified $\delta$-axis current value $i_\delta^*$ from the speed controller 17 and the $\delta$-axis superposed current $ih_\delta$ from the superposed current generator 24.

The subtracter 13 subtracts the $\gamma$-axis current $i_\gamma$ outputted from the coordinate converter 12 from the sum $(i_\gamma^* + ih_\gamma)$ calculated by the adder 25 to calculate a current error $(i_\gamma^* + ih_\gamma - i_\gamma)$. The subtracter 14 subtracts the $\delta$-axis current $i_\delta$ outputted from the coordinate converter 12 from the sum $(i_\delta^* + ih_\delta)$ calculated by the adder 26 to calculate a current error $(i_\delta^* + ih_\delta - i_\delta)$.

The current errors calculated by the subtracters 13 and 14, the $\gamma$-axis current $i_\gamma$ and the $\delta$-axis current $i_\delta$ from the coordinate converter 12, and the estimated motor speed $\omega_e$ from the estimator 20a are fed to the current controller 15a, which then outputs a specified $\gamma$-axis voltage value $v_\gamma^*$ and a specified $\delta$-axis voltage value $v_\delta^*$ such that the $\gamma$-axis current $i_\gamma$ keeps up with the specified $\gamma$-axis current value (namely $(i_\gamma^* + ih_\gamma)$) having the $\gamma$-axis superposed current $ih_\gamma$ superposed thereon, and that the $\delta$-axis current $i_\delta$ keeps up with the specified $\delta$-axis current value (namely $(i_\delta^* + ih_\delta)$) having the $\delta$-axis superposed current $ih_\gamma$ superposed thereon. Thus, the specified $\gamma$-axis voltage value $v_\gamma^*$ and the specified $\delta$-axis voltage value $v_\delta^*$ contains a superposed voltage (superposed component) commensurate with the superposed current. The $\gamma$-axis component and the $\delta$-axis component of this superposed voltage are called the $\gamma$-axis superposed voltage $vh_\gamma$ and the $\delta$-axis superposed voltage $vh_\delta$, respectively. The $\gamma$-axis superposed voltage $vh_\gamma$ has a value commensurate with the $\gamma$-axis superposed current $ih_\gamma$, and the $\delta$-axis superposed voltage $vh_\delta$ has a value commensurate with the $\delta$-axis superposed current $ih_\delta$.

Based on the estimated rotor position $\theta_e$ fed from the estimator 20a, the coordinate converter 18a converts backward the specified $\gamma$-axis voltage value $v_\gamma^*$ and the specified $\delta$-axis voltage value $v_\delta^*$, both containing the superposed voltage; the coordinate converter 18a thereby produces specified three-phase voltage values consisting of a specified U-phase voltage value $v_u^*$, a specified V-phase voltage value $v_v^*$, and a specified W-phase voltage value $v_w^*$, which represent the U-phase component, the V-phase component, and the W-phase component of the motor voltage $V_a$, and then outputs them to the inverter 2. The backward conversion here is performed according to formula (8), consisting of two equations, below. Needless to say, the values $v_\gamma^*$ and $v_\delta^*$ appearing in formula (8) are those outputted from the current controller 15a (and are hence different from $v_\gamma^*$ and $v_\delta^*$ shown in FIG. 3).

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* \\ v_\delta^* \end{bmatrix} \quad (8)$$

$$v_w^* = -(v_u^* + v_v^*)$$

Based on the specified three-phase voltage values ($v_u^*$, $v_v^*$, and $v_w^*$), which represent the voltage to be applied to the motor 1, the inverter 2 produces pulse-width-modulated signals, and feeds the motor 1 with a motor current $I_a$ commensurate with those specified three-phase voltage values to drive the motor 1.

As in the first embodiment, in this embodiment also, the current represented by the specified $\gamma$-axis current value $i_\gamma^*$ and the specified $\delta$-axis current value $i_\delta^*$ is the drive current with which the motor 1 is driven. In this embodiment, however, the voltage represented by the specified $\gamma$-axis voltage value $v_\gamma^*$ and the specified $\delta$-axis voltage value $v_\delta^*$ is the "drive voltage applied to the motor 1 to pass the drive current therethrough" having added thereto the "superposed voltage applied to the motor 1 to pass therethrough the superposed current generated by the superposed current generator 24".

Figure 19:
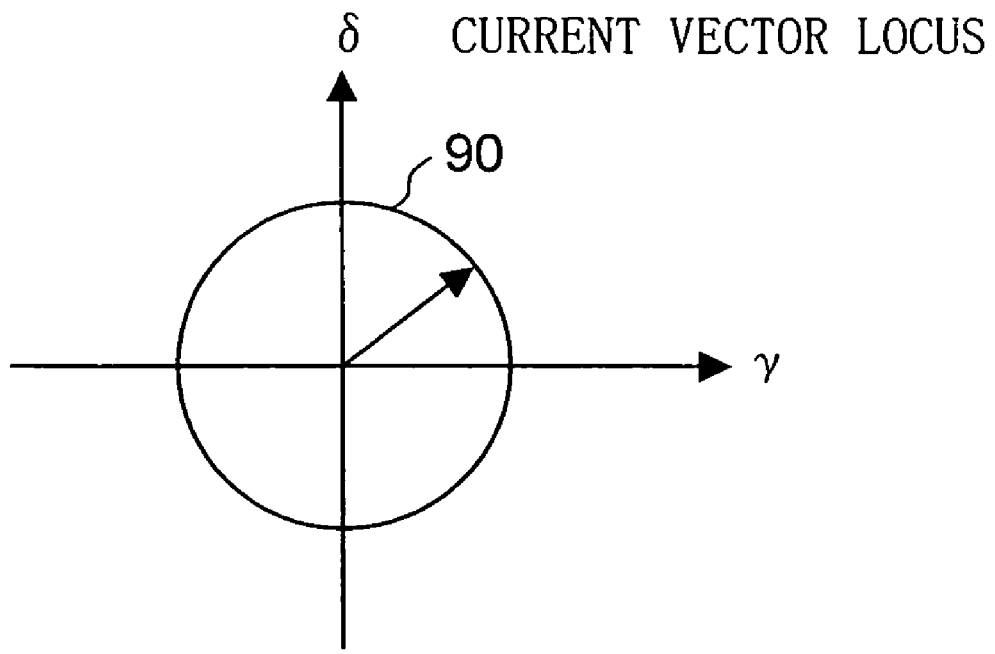
FIG. 19 is a diagram showing an example of the current vector locus (here, a perfect-circle current vector locus) of the superposed current outputted from the superposed current generator shown in FIG. 18.

The superposed current generated by the superposed current generator 24 is a high-frequency rotation current. Here, "high frequency" denotes that the frequency of the superposed current is sufficiently higher than that of the drive current. Moreover, "rotation current" denotes a current of which the current vector locus describes a circle on the $\gamma$-$\delta$ axes (in the $\gamma$-$\delta$ coordinate system) as shown in FIG. 19. Since this rotation current is a high-frequency current that is not synchronous with the motor 1, applying the rotation current to the motor 1 does not cause it to rotate. Moreover, the $\gamma$-axis superposed current $ih_\gamma$ and the $\delta$-axis superposed current $ih_\delta$ generated by the superposed current generator 24 are so set as to be commensurate with (or equal to), respectively, the $\gamma$-axis superposed current $ih_\gamma$ and the $\delta$-axis superposed current $ih_\delta$ that are expected to be superposed in the first embodiment.

Figure 20:
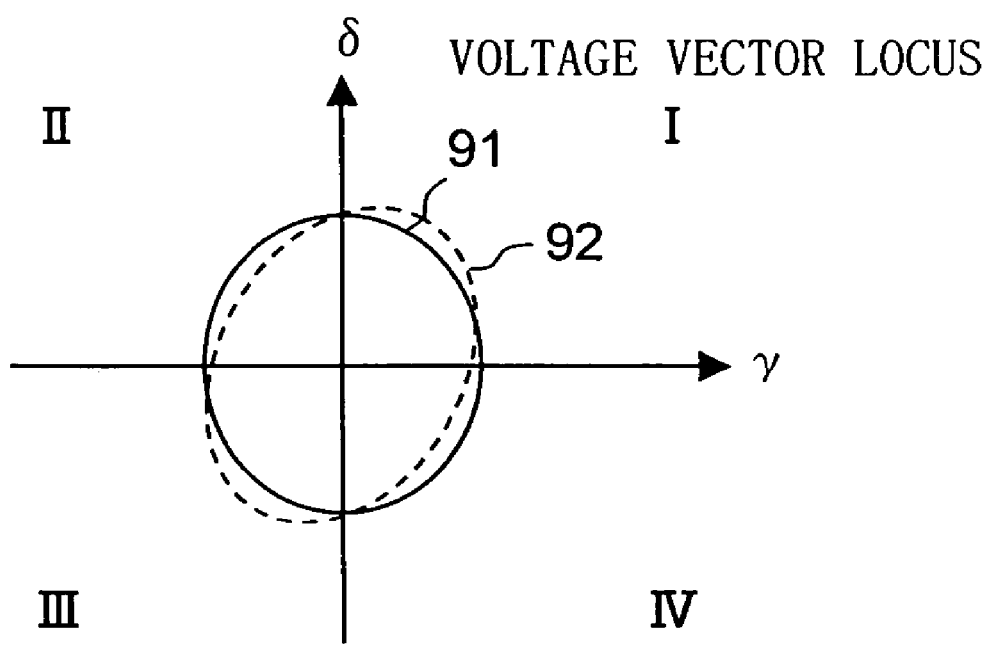
FIG. 20 is a diagram showing the voltage vector locus of the superposed voltage that is applied according to the superposed current shown in FIG. 19.

In a case where the motor 1 is an interior-permanent-magnet synchronous motor or the like and where $L_d < L_q$ holds, when the current vector locus of the superposed current describes a perfect circle having its center at the origin on the $\gamma$-$\delta$ axes (in the $\gamma$-$\delta$ coordinate system), as indicated by a current vector locus 90 in FIG. 19, the voltage vector locus of the superposed voltage contained in the specified $\gamma$-axis voltage value $v_\gamma^*$ and the specified $\delta$-axis voltage value $v_\delta^*$ describes an ellipse having its center at the origin on the $\gamma$-$\delta$ axes (in the $\gamma$-$\delta$ coordinate system) and having its minor-axis direction running on the $\gamma$-axis direction and its major-axis direction running on the $\delta$-axis direction, as indicated by a voltage vector locus 91 in FIG. 20. It should be noted that the voltage vector locus 91 is one observed when the axis error $\Delta\theta$ is zero. When the axis error $\Delta\theta$ is non-zero, the voltage vector locus of the superposed voltage describes an ellipse as indicated by a voltage vector locus 92, and its minor-axis direction (or major-axis direction) does not coincide with the $\gamma$-axis (or $\delta$-axis) direction. That is, when the axis error $\Delta\theta$ is non-zero, on the $\gamma$-$\delta$ axes (in the $\gamma$-$\delta$ coordinate system), the voltage vector locus 91 is inclined about the origin so as to describe the voltage vector locus 92 instead.

Figure 21:
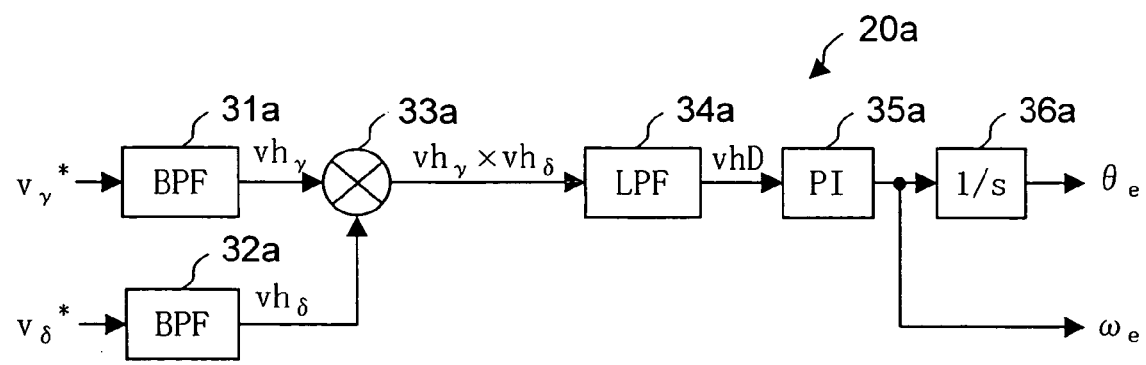
FIG. 21 is a block diagram showing an example of the internal configuration of the position/speed estimator shown in FIG. 18.

Thus, by a method similar to that used in the first embodiment, the rotor position can be estimated. Specifically, the estimator 20a can estimate the estimated rotor position $\theta_e$ and the estimated motor speed $\omega_e$ with the $\gamma$-$\delta$ axes so modified that the direct-current component of the arithmetic product $(vh_\gamma \times vh_\delta)$ converges to zero. FIG. 21 is a block diagram showing an example of the internal configuration of the estimator 20a. The estimator 20a shown in FIG. 21 is composed of BPFs (band-pass filters) 31a and 32a, a multiplier 33a, an LPF (low-pass filter) 34a, a proportional-plus-integral calculator 35a, and a integrator 36a.

The BPF 31a extracts, from the specified $\gamma$-axis voltage value $v_\gamma^*$ outputted from the current controller 15a, the $\gamma$-axis superposed voltage $vh_\gamma$, which is the component superposed thereon. Likewise, the BPF 32a extracts, from the specified $\delta$-axis voltage value $V_\delta^*$ outputted from the current controller 15a, the $\delta$-axis superposed voltage $vh_\delta$, which is the component superposed thereon. The multiplier 33a calculates the arithmetic product $(vh_\gamma \times vh_\delta)$ of the $\gamma$-axis superposed voltage $vh_\gamma$ and the δ-axis superposed voltage $vh_\delta$ extracted by the BPFs 31a and 32a. The LPF 34a removes a high-frequency component from this arithmetic product ($vh_\gamma \times vh_\delta$), and thereby extracts the direct-current component vhD of the arithmetic product ($vh_\gamma \times vh_\delta$).

To achieve PLL (phase-locked loop) control, the proportional-plus-integral calculator 35a, while cooperating with the individual functional blocks of the position-sensorless control device 3a, performs proportional-plus-integral control, and thereby calculates the estimated motor speed $\omega_e$ such that the direct-current component vhD outputted from the LPF 34a converges to zero (i.e. so that the axis error $\Delta\theta$ converges to zero). The integrator 36a integrates the estimated motor speed $\omega_e$ outputted from the proportional-plus-integral calculator 35a to calculate the estimated rotor position $\theta_e$. The estimated motor speed $\omega_e$ outputted from the proportional-plus-integral calculator 35a and the estimated rotor position $\theta_e$ outputted from the integrator 36a are both, as the output values of the estimator 20a, fed to the relevant functional blocks of the position-sensorless control device 3a that need them.

With the configuration shown in FIGS. 18 and 21, the axis error $\Delta\theta$ can be made to converge to zero. Moreover, here, the processing required to estimate the rotor position is simpler (the amount of computational operation required to do that is smaller) than is conventionally required, and is easy to realize. This offers high practicality. In particular, when the motor 1 is at standstill or is rotating at low speed, the rotor position can be properly estimated. Needless to say, no position sensor (unillustrated) any longer needs to be provided in the motor drive system. This is expected to lead to reduced cost and other benefits.

As in the first embodiment, the LPF 34a may be replaced with an n-period integrator (unillustrated) that integrates the arithmetic product ($vh_\gamma \times vh_\delta$) of n-period worth (where n is an integer equal to or greater than one) of the superposed current and that thereby extracts the direct-current component vhD, or may be replaced with a moving averager (unillustrated) that calculates the direct-current component vhD from the moving averages of the arithmetic product ($vh_\gamma \times vh_\delta$) of n-period worth of the superposed current. As in the first embodiment, as a method for extracting the direct-current component vhD from the arithmetic product ($vh_\gamma \times vh_\delta$), it is possible even to adopt a combination of more than one of the following methods: low-pass filtering, integration (n-period integration), moving averaging, etc.

In a case where a two-phase rotation current is used as the superposed current, the amplitude of the γ-axis superposed current $ih_\gamma$ and the amplitude of the δ-axis superposed current $ih_\delta$ may be different, so long as the voltage vector locus of the superposed voltage commensurate with the superposed current describes an ellipse having its center at the origin on the γ-δ axes (in the γ-δ coordinate system). This is because, even when those amplitudes are different, the direct-current component of the arithmetic product ($vh_\gamma \times vh_\delta$) varies according to the axis error $\Delta\theta$. When the amplitude of the γ-axis superposed current $ih_\gamma$ is greater than the amplitude of the δ-axis superposed current $ih_\delta$, the current vector locus of the superposed current describes an ellipse having its center at the origin on the γ-δ axes (in the γ-δ coordinate system) and having its major-axis direction running on the γ-axis direction and its minor-axis direction running on the δ-axis direction. In contrast, when the amplitude of the γ-axis superposed current $ih_\gamma$ is smaller than the amplitude of the δ-axis superposed current $ih_\delta$, the current vector locus of the superposed current describes an ellipse having its center at the origin on the γ-δ axes (in the γ-δ coordinate system) and having its minor-axis direction running on the γ-axis direction and its major-axis direction running on the δ-axis direction.

It is possible even to adopt a single-phase alternating current as the superposed current. This is because, even in this case, the direct-current component of the arithmetic product ($vh_\gamma \times vh_\delta$) varies according to the axis error $\Delta\theta$. For example, of the γ-axis superposed current $ih_\gamma$ and the δ-axis superposed current $ih_\delta$, only the δ-axis superposed current $ih_\delta$ may be made zero, in which case the superposed current is a single-phase high-frequency current (a high-frequency alternating current in the γ phase) consisting only of a γ-axis current component; or only the γ-axis superposed current $ih_\gamma$ may be made zero, in which case the superposed current is a single-phase high-frequency current (a high-frequency alternating current in the δ phase) consisting only of a δ-axis current component. Since this single-phase alternating current also is a high-frequency current that is not synchronous with the motor 1, applying the alternating current to the motor 1 does not cause it to rotate. For example, in a case where, of the γ-axis superposed current $ih_\gamma$ and the δ-axis superposed current $ih_\delta$, only the γ-axis superposed current $ih_\gamma$ is made zero, the current vector locus of the superposed current describes a line segment having its mid point at the origin on the γ-δ axes (in the γ-δ coordinate system) and lying on the δ-axis. Needless to say, only the δ-axis superposed current $ih_\delta$ may be made zero.

What relationship to set between the amplitude of the γ-axis superposed current $ih_\gamma$ and the amplitude of the δ-axis superposed current $ih_\delta$ in a case where a two-phase rotation current is adopted as the superposed current, or what single-phase alternating current to adopt as the superposed current, is decided appropriately according to the characteristics of the motor 1 and the situation in which the motor drive system is used.

To obtain a two-phase rotation current as the superposed current, it is necessary that the γ-axis superposed current $ih_\delta$ and the δ-axis superposed current $ih_\gamma$ be sine waves, but it is not always necessary that the γ-axis superposed current $ih_\gamma$ and/or the δ-axis superposed current $ih_\delta$ be sine waves. So long as the current vector locus of the superposed current on the γ-δ axes (in the γ-δ coordinate system) describes a figure that encloses the origin and that is symmetric about the γ-axis or the δ-axis, the γ-axis superposed current $ih_\gamma$ and the δ-axis superposed current $ih_\delta$ may be given any waveforms. So long as the current vector locus of the superposed current on the γ-δ axes (in the γ-δ coordinate system) describes a figure that encloses the origin and that is symmetric about the γ-axis or the δ-axis, just as in a case where a two-phase rotation current is adopted as the superposed current, when the axis error $\Delta\theta$ equals 0°, the arithmetic product ($vh_\gamma \times vh_\delta$) contains no direct-current component and, as the magnitude of the axis error $\Delta\theta$ increases from 0°, the direct-current component of the arithmetic product ($vh_\gamma \times vh_\delta$) increases starting with zero. For example, the γ-axis superposed current $ih_\gamma$ and the δ-axis superposed current $_\delta$ may be rectangular waves.

It should be understood that the above-noted expression "enclose the origin" denotes that the origin on the γ-δ axes (in the γ-δ coordinate system) lies inside the above-mentioned "figure that is symmetric". It should also be understood that the above-noted expression "symmetric about the γ-axis" denotes that, of the current vector locus on the γ-δ axes (in the γ-δ coordinate system), the part lying in the first and second quadrants and the part lying in the third and fourth quadrants are symmetric with each other about the γ-axis. Likewise, it should also be understood that the above-noted expression "symmetric about the δ-axis" denotes that, of the current vector locus on the γ-δ axes (in the γ-δ coordinate system), the part lying in the first and fourth quadrants and the part lying in the second and third quadrants are symmetric with each other about the δ-axis.

As the motor 1, a surface-permanent-magnet synchronous motor, which is a type of non-salient-pole motor, may be adopted. It should be noted, however, that, in a case where a non-salient-pole motor is used as the motor 1, when the current vector locus of the superposed current on the γ-δ axes (in the γ-δ coordinate system) describes a perfect circle, like the current vector locus 90 shown in FIG. 19 (i.e. when, in the rotation current, the amplitude of the γ-axis superposed current $ih_\gamma$ and the amplitude of the δ-axis superposed current $ih_\delta$ are equal), the voltage vector locus of the superposed voltage on the γ-δ axes (in the γ-δ coordinate system) also describes a perfect circle having its center at the origin (provided that no magnetic saturation is occurring). When the voltage vector locus of the superposed voltage describes a perfect circle, if the perfect circle becomes inclined as a result of the axis error Δθ being non-zero, the inclination cannot be grasped.

In such a case, it is advisable to increase the γ-axis component of the superposed current in such a direction as to increase the magnetic flux pointing in the same direction as the armature flux linkage $\Phi_a$ attributable to the permanent magnet 1a, in order to thereby intentionally cause magnetic saturation in the motor 1. When magnetic saturation occurs, the d-axis inductance $L_d$ decreases, making the γ-axis superposed current $ih_\gamma$ easier to flow; thus, even in a case where a superposed current of which the current vector locus describes a perfect circle is superposed, the voltage vector locus of the superposed voltage does not describe a perfect circle. Hence, when axis error Δθ≠0, the direct-current component of the arithmetic product $(vh_\gamma \times vh_\delta)$ has a non-zero value. Thus, by the same method as described above, the rotor position can be estimated. Specifically, it is advisable to superpose on the drive current a superposed current that causes the d-axis inductance $L_d$ of the motor 1, which is here a non-salient-pole motor, to vary by magnetic saturation attributable to the γ-axis superposed current $ih_\gamma$.

Needless to say, even in a case where a non-salient-pole motor is adopted as the motor 1, a two-phase rotation current in which the amplitude of the γ-axis superposed current $ih_\gamma$ and the amplitude of the δ-axis superposed current $ih_\delta$ differ may be adopted as the superposed current, or a single-phase alternating current may be adopted as the superposed current. Needless to say, to exploit the magnetic saturation attributable to the γ-axis superposed current $ih_\gamma$, however, the γ-axis superposed current $ih_\gamma$ should not be zero.

The current controller 15a performs necessary computational operation according to the formula obtained by replacing the term $(i_\gamma^* - i_\gamma)$ in the right side of formula (4a) above with $(i_\gamma^* + ih_\gamma - i_{\gamma5})$ and the formula obtained by replacing the term $(i_\delta^* - i_\delta)$ in the righ formula (4b) above with $(i_\delta^* + ih_\delta - i_\delta)$. The proportional-plus-integral calculator 35a performs necessary computational operation according to the formula obtained by replacing the term ihD in the right side of formula (7) above with vhD.

In the first embodiment, the superposed voltage generator 21 and the adders 22 and 23 together form a superposer (voltage superposer). In the first embodiment, the BPFs 31 and 32 and the multiplier 33 together form a superposed component extractor. This superposed component extractor may be regarded as including a functional block that outputs the direct-current component ihD. Specifically, for example, the superposed component extractor may be regarded as including the LPF 34, the n-period integrator 37, or a moving averager (unillustrated), or as including the LPF 38 and the moving averager 39. In the first embodiment, the functional blocks of the position-sensorless control device 3 other than those mentioned above as forming the superposer and the superposed component extractor together form a controller.

In the second embodiment, the superposed current generator 24 and the adders 25 and 26 together form a superposer. In the second embodiment, the BPFs 31a and 32a and the multiplier 33a together form a superposed component extractor. This superposed component extractor may be regarded as including a functional block that outputs the direct-current component vhD. Specifically, for example, the superposed component extractor may be regarded as including the LPF 34a, an n-period integrator (unillustrated), or a moving averager (unillustrated). In the second embodiment, the functional blocks of the position-sensorless control device 3a other than those mentioned above as forming the superposer and the superposed component extractor together form a controller.

In both the first and second embodiments, the current detector 11 may be so configured as to directly detect the motor current as shown in FIG. 3 etc; instead, it may be so configured as to detect the motor current by reproducing it from the instantaneous current of the power-source-side DC current.

The present invention is suitable for all kinds of electric appliances that employ motors. The present invention is suitable, in particular, in electric cars that are driven by the rotation of motors and in compressors and the like that are used in air conditioners and the like.

What is claimed is:

1. A position-sensorless motor control device for controlling a motor, wherein
   let an axis parallel to a magnetic flux produced by a permanent magnet forming a rotor of the motor be called a d axis,
   let an axis estimated, for a purpose of control, to correspond to the d axis be called a γ axis, and
   let an axis estimated to lead the γ axis by an electrical angle of 90 degrees be called a δ axis,
   then the position-sensorless motor control device controls the motor such that an axis error between the d- and γ-axes is reduced,
   the position-sensorless motor control device comprising:
   a superposer that superposes, on a drive current with which the motor is driven, a superposed current having a different frequency than the drive current;
   a superposed component extractor that extracts, from a motor current fed to the motor, γ-axis and δ-axis components of the superposed current; and
   a controller that reduces the axis error by controlling the motor based on an arithmetic product of the γ-axis and δ-axis components of the superposed current.

2. The position-sensorless motor control device of claim 1,
   wherein the superposer superposes the superposed current on the drive current by superposing a superposed voltage commensurate with the superposed current on a drive voltage that is applied to the motor to pass the drive current therethrough.

3. The position-sensorless motor control device of claim 2,
   wherein a voltage vector locus of the superposed voltage on the γ-δ axes describes a figure symmetric about the γ or δ axis.

4. The position-sensorless motor control device of claim 2,
wherein a voltage vector locus of the superposed voltage on the γ-δ axes describes a perfect circle, or an ellipse having a minor or major axis on the γ axis, or a line segment on the γ or δ axis.

5. The position-sensorless motor control device of claim 2, wherein
the motor is a non-salient-pole motor, and
the superposed voltage that the superposer superposes on the drive voltage is a voltage that causes a d-axis component of an inductance of the motor to vary by magnetic saturation attributable to a γ-axis component of the superposed current.

6. The position-sensorless motor control device of claim 1,
wherein the controller reduces the axis error by controlling the motor based on a direct-current component of the arithmetic product.

7. The position-sensorless motor control device of claim 6,
wherein the controller reduces the axis error by controlling the motor such that the direct-current component converges to zero.

8. A motor drive system comprising:
a motor;
an inverter for driving the motor; and
the position-sensorless motor control device of claim 1, which controls the motor by controlling the inverter.

9. A position-sensorless motor control device for controlling a motor, wherein
let an axis parallel to a magnetic flux produced by a permanent magnet forming a rotor of the motor be called a d axis,
let an axis estimated, for a purpose of control, to correspond to the d axis be called a γ axis, and
let an axis estimated to lead the γ axis by an electrical angle of 90 degrees be called a δ axis,
then the position-sensorless motor control device controls the motor such that an axis error between the d- and γ-axes is reduced,
the position-sensorless motor control device comprising:
a superposer that superposes, on a drive current with which the motor is driven, a superposed current having a different frequency than the drive current;
a superposed component extractor that extracts γ-axis and δ-axis components of a superposed voltage that is applied to the motor to superpose the superposed current on the drive current; and
a controller that reduces the axis error by controlling the motor based on an arithmetic product of the extracted γ-axis and δ-axis components of the superposed voltage.

10. The position-sensorless motor control device of claim 9,
wherein the controller reduces the axis error by controlling the motor based on a direct-current component of the arithmetic product.

11. The position-sensorless motor control device of claim 10,
wherein the controller reduces the axis error by controlling the motor such that the direct-current component converges to zero.

12. The position-sensorless motor control device of claim 9,
wherein a current vector locus of the superposed current on the γ-δ axes describes a figure symmetric about the γ or δ axis.

13. The position-sensorless motor control device of claim 9,
wherein a current vector locus of the superposed current on the γ-δ axes describes a perfect circle, or an ellipse having a minor or major axis on the γ axis, or a line segment on the γ or δ axis.

14. The position-sensorless motor control device of claim 9, wherein
the motor is a non-salient-pole motor, and
the superposed current that the superposer superposes on the drive current is a current that causes a d-axis component of an inductance of the motor to vary by magnetic saturation attributable to a γ-axis component of the superposed current.

15. A motor drive system comprising:
a motor;
an inverter for driving the motor; and
the position-sensorless motor control device of claim 9, which controls the motor by controlling the inverter.

* * * * *